(12) United States Patent
Noh et al.

(10) Patent No.: US 12,153,323 B2
(45) Date of Patent: Nov. 26, 2024

(54) LIGHT PATH CONTROL MEMBER, AND DISPLAY DEVICE COMPRISING SAME

(71) Applicant: LG INNOTEK CO., LTD., Seoul (KR)

(72) Inventors: Jin Mi Noh, Seoul (KR); Byung Sook Kim, Seoul (KR); Ho Young Kim, Seoul (KR); Hyeon Ji Hong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 18/260,132

(22) PCT Filed: Jan. 4, 2022

(86) PCT No.: PCT/KR2022/095003
§ 371 (c)(1),
(2) Date: Jun. 30, 2023

(87) PCT Pub. No.: WO2022/146132
PCT Pub. Date: Jul. 7, 2022

(65) Prior Publication Data
US 2024/0061304 A1    Feb. 22, 2024

(30) Foreign Application Priority Data

Jan. 4, 2021    (KR) .................. 10-2021-0000219
Jan. 4, 2021    (KR) .................. 10-2021-0000225

(51) Int. Cl.
*G02F 1/16766*    (2019.01)
*G02F 1/1333*    (2006.01)
(Continued)

(52) U.S. Cl.
CPC ...... *G02F 1/16766* (2019.01); *G02F 1/13338* (2013.01); *G02F 1/133514* (2013.01); *G02F 1/134318* (2021.01)

(58) Field of Classification Search
CPC ........... G02F 1/16766; G02F 1/134318; G02F 1/13338; G02F 1/133514
(Continued)

(56) References Cited

U.S. PATENT DOCUMENTS

| 2009/0027603 A1 | 1/2009 | Samulski et al. |
| 2014/0176671 A1* | 6/2014 | Choi .................. G02F 1/29 348/40 |

(Continued)

FOREIGN PATENT DOCUMENTS

| KR | 10-2007-0119624 A | 12/2007 |
| KR | 10-2015-0126515 A | 11/2015 |

(Continued)

OTHER PUBLICATIONS

International Search Report dated Apr. 21, 2022 in International Application No. PCT/KR2022/095003.

(Continued)

*Primary Examiner* — Jessica M Merlin
*Assistant Examiner* — William D Peterson
(74) *Attorney, Agent, or Firm* — Saliwanchik, Lloyd & Eisenschenk

(57) ABSTRACT

A light path control member according to an embodiment comprises: a first substrate by which a first direction and a second direction are defined; a first electrode disposed on the first substrate; a second substrate disposed on the first substrate; a second electrode disposed under the second substrate; and a light conversion unit disposed between the first electrode and the second electrode, wherein the light conversion unit comprises: a plurality of partitions; a plurality of accommodation units; and a base, wherein the accommodation units extend in the second direction, the first electrode includes a plurality of first pattern electrodes extending in the second direction and spaced apart from (Continued)

each other, and the first pattern electrodes overlap the accommodation units.

20 Claims, 20 Drawing Sheets

(51) Int. Cl.
  *G02F 1/1335* (2006.01)
  *G02F 1/1343* (2006.01)
(58) Field of Classification Search
  USPC .......................................................... 349/139
  See application file for complete search history.

(56) References Cited

U.S. PATENT DOCUMENTS

| | | |
|---|---|---|
| 2020/0326604 A1 | 10/2020 | Yoon et al. |
| 2021/0373403 A1 | 12/2021 | Kim et al. |

FOREIGN PATENT DOCUMENTS

| | | | |
|---|---|---|---|
| KR | 20150126515 A | * | 11/2015 |
| KR | 10-2016-0069347 A | | 6/2016 |
| KR | 10-2016-0096263 A | | 8/2016 |
| KR | 10-1756506 B1 | | 7/2017 |
| KR | 10-2018-0010485 A | | 1/2018 |
| KR | 10-1971874 B1 | | 4/2019 |
| KR | 10-2019-0050722 A | | 5/2019 |
| KR | 10-2020-0012683 A | | 2/2020 |
| KR | 10-2020-0028078 A | | 3/2020 |
| KR | 10-2020-0058096 A | | 5/2020 |

OTHER PUBLICATIONS

Office Action dated Aug. 7, 2024 in Korean Application No. 10-2021-0000225.

* cited by examiner (a)

(b)

LIGHT PATH CONTROL MEMBER, AND DISPLAY DEVICE COMPRISING SAME

CROSS-REFERENCE TO RELATED APPLICATIONS

This application is the U.S. national stage application of International Patent Application No. PCT/KR2022/095003, filed Jan. 4, 2022, which claims the benefit under 35 U.S.C. § 119 of Korean Application Nos. 10-2021-0000219, filed Jan. 4, 2021; and 10-2021-0000225, filed Jan. 4, 2021, the disclosures of each of which are incorporated herein by reference in their entirety.

TECHNICAL FIELD

Embodiments relate to a light path control member and a display device including the same.

BACKGROUND ART

A light blocking film blocks transmitting of light from a light source, and is attached to a front surface of a display panel which is a display device used for a mobile phone, a notebook, a tablet PC, a vehicle navigation device, a vehicle touch, etc., so that the light blocking film adjusts a viewing angle of light according to an incident angle of light to express a clear image quality at a viewing angle needed by a user when the display transmits a screen.

In addition, the light blocking film may be used for the window of a vehicle, building or the like to shield outside light partially to inhibit glare, or to inhibit the inside from being visible from the outside.

That is, the light blocking film may be a light path control member that controls the movement path of light to block light in a specific direction and transmit light in a specific direction. Accordingly, it is possible to control the viewing angle of the user by controlling a transmission angle of the light by the light blocking film.

Meanwhile, such a light blocking film may be divided into a light blocking film that can always control the viewing angle regardless of the surrounding environment or the user's environment and a switchable light blocking film that allow the user to turn on/off the viewing angle control according to the surrounding environment or the user's environment.

Such a switchable light blocking film may be implemented by converting a accommodating portion into a light transmitting part and a light blocking part by filling the inside of the accommodating portion with light conversion material including particles that may move when a voltage is applied and a dispersion liquid for dispersing the particles and by dispersing and aggregating the particles. The switchable light blocking film includes the accommodating portions and partition wall portions.

In this case, when the light blocking film is repeatedly driven, charges may be accumulated on the surface of the partition wall portion. Movement of the light conversion particles moving in the accommodating portion may be hindered by charges accumulated on the surface of the partition wall portion. Accordingly, the moving speed of the light conversion particles in the accommodating portion of the light path control member may be reduced. In addition, driving characteristics and light conversion characteristics of the light path control member may be reduced by the light conversion particles remaining on the partition wall portion without moving.

Accordingly, the light path control member having a new structure capable of solving the above problems is required.

DISCLOSURE

Technical Problem

Embodiments provide a light path control member having improved driving characteristics.

Technical Solution

A light path control member according to an embodiment includes: a first substrate on which a first direction and a second direction are defined; a first electrode disposed on the first substrate; a second substrate disposed on the first substrate; a second electrode disposed under the second substrate; and a light conversion unit disposed between the first electrode and the second electrode, the light conversion unit includes a plurality of partition wall portions, a plurality of accommodating portions, and a base portion, the accommodating portion extends in the second direction, the first electrode includes a plurality of first pattern electrodes extending in the second direction and spaced apart from each other, and the first pattern electrode overlaps the accommodating portion.

Advantageous Effects

In the light path control member according to the embodiment, electrodes disposed under or above the light conversion unit are disposed as a plurality of pattern electrodes spaced apart from each other.

The pattern electrodes overlap only the accommodating portion of the light conversion unit. Alternatively, an overlapping area between the pattern electrode and the accommodating portion is larger than an overlapping area between the pattern electrode and the partition wall portion. Accordingly, it is possible to minimize the movement of charges moving in the direction of the barrier rib through the lower or upper electrode.

Accordingly, it is possible to minimize interference with movement of the light conversion particles moving in the accommodating part due to charges accumulated on the surface of the barrier rib part.

Accordingly, the amount of charge remaining on the surface of the partition wall portion may be minimized even when the light path control member is repeatedly driven. Accordingly, the driving characteristics and driving time of the light path control member may be improved.

MODES OF THE INVENTION

Hereinafter, embodiments of the present invention will be described in detail with reference to the accompanying drawings. However, the spirit and scope of the present invention is not limited to a part of the embodiments described, and may be implemented in various other forms, and within the spirit and scope of the present invention, one or more of the elements of the embodiments may be selectively combined and replaced.

In addition, unless expressly otherwise defined and described, the terms used in the embodiments of the present invention (including technical and scientific terms) may be construed the same meaning as commonly understood by one of ordinary skill in the art to which this invention belongs, and the terms such as those defined in commonly used dictionaries may be interpreted as having a meaning that is consistent with their meaning in the context of the relevant art.

In addition, the terms used in the embodiments of the present invention are for describing the embodiments and are not intended to limit the present invention. In this specification, the singular forms may also include the plural forms unless specifically stated in the phrase, and may include at least one of all combinations that may be combined in A, B, and C when described in "at least one (or more) of A (and), B, and C".

Further, in describing the elements of the embodiments of the present invention, the terms such as first, second, A, B, (a), and (b) may be used. These terms are only used to distinguish the elements from other elements, and the terms are not limited to the essence, order, or order of the elements.

In addition, when an element is described as being "connected", or "coupled" to another element, it may include not only when the element is directly "connected" to, or "coupled" to other elements, but also when the element is "connected", or "coupled" by another element between the element and other elements.

Further, when described as being formed or disposed "on (over)" or "under (below)" of each element, the "on (over)" or "under (below)" may include not only when two elements are directly connected to each other, but also when one or more other elements are formed or disposed between two elements.

Furthermore, when expressed as "on (over)" or "under (below)", it may include not only the upper direction but also the lower direction based on one element.

Hereinafter, a light path control member according to an embodiment will be described with reference to drawings.

Figure 1:
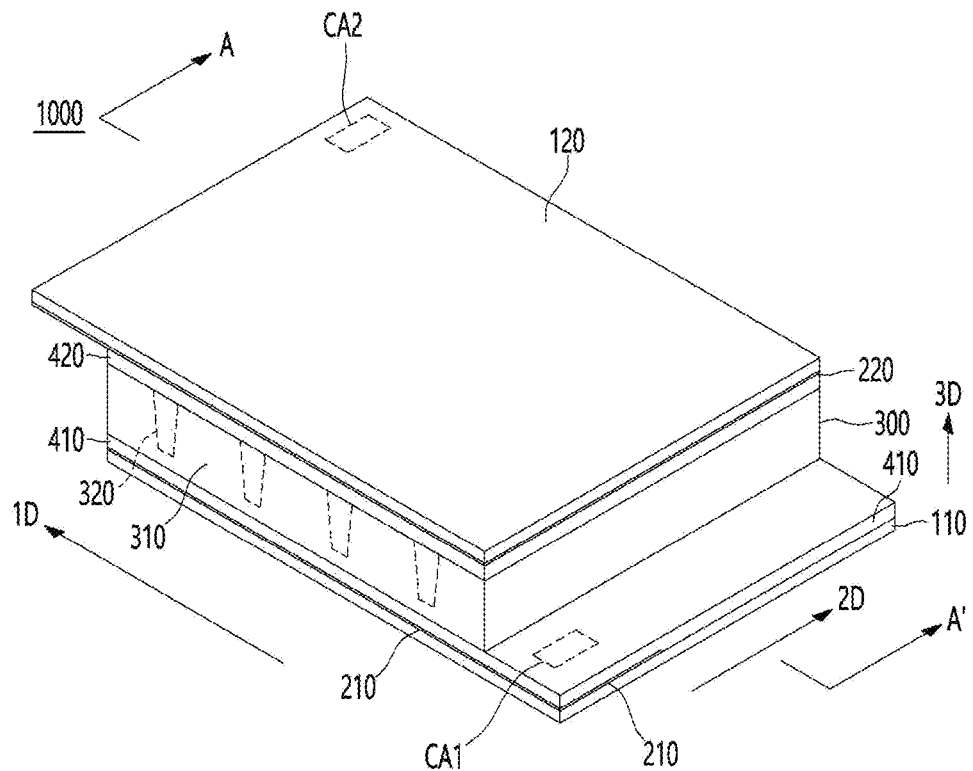
FIG. 1 is a perspective view of a light path control member according to an embodiment.

FIG. 1 is a perspective view of a light path control member according to an embodiment.

Referring to FIG. 1, the light path control member 1000 according to the embodiment may include a first substrate 110, a second substrate 120, a first electrode 210, a second electrode 220, a light conversion unit 300.

The first substrate 110 and the second substrate 120 may be rigid or flexible.

In addition, the first substrate 110 and the second substrate 120 may be transparent. For example, the first substrate 110 and the second substrate 120 may include transparent substrates capable of transmitting light.

The first substrate 110 and the second substrate 120 may include glass, plastic, or a flexible polymer film. For example, the flexible polymer film may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS), which is only an example, but the embodiment is not limited thereto.

In addition, the first substrate 110 and the second substrate 120 may be flexible substrates having flexible characteristics.

In addition, the first substrate 110 and the second substrate 120 may be curved or bent substrates. That is, the light path control member including the first substrate 110 and the second substrate 120 may also be formed to have a flexible, curved or bended characteristic. Therefore, the light path control member according to the embodiment may be changed into various designs.

The first electrode 210 and the second electrode 220 may include a transparent conductive material. For example, the first electrode 210 and the second electrode 220 may include a conductive material having a light transmittance of about 80% or more. For example, the first electrode 210 and the second electrode 220 may include a metal oxide such as indium tin oxide, indium zinc oxide, copper oxide, tin oxide, zinc oxide, titanium oxide, etc.

The first electrode 210 and the second electrode 220 may have a thickness of about 10 nm to about 300 nm.

Alternatively, the first electrode 210 and the second electrode 220 may include various metals to realize low resistance. For example, the first electrode 210 and the second electrode 220 may include at least one metal of chromium (Cr), nickel (Ni), copper (Cu), aluminum (Al), silver (Ag), molybdenum (Mo), gold (Au), titanium (Ti), and alloys thereof.

The light conversion unit 300 may be disposed between the first substrate 110 and the second substrate 120. In detail, the light conversion unit 300 may be disposed between the first electrode 210 and the second electrode 220.

A buffer layer 410 may be disposed between the light conversion unit 300 and the first electrode 210. The buffer layer 410 may improve an adhesion between the first electrode 210 and the light conversion unit 300, which are different materials.

An adhesive layer 420 may be disposed between the light conversion unit 300 and the second electrode 220. The light conversion unit 300 and the second electrode 220 may be bonded by the adhesive layer 420.

The buffer layer 410 and the adhesive layer 420 may include a transparent material capable of transmitting light. For example, the buffer layer 410 may include a transparent resin material, and the adhesive layer 420 may include optically clear adhesive (OCA).

The light path control member may extend in a first direction 1D, a second direction 2D, and a third direction 3D.

In detail, the light path control member may include the first direction 1D, the second direction 2D, and the third direction 3D. The first direction 1D corresponds to a length or width direction of the light path control member, the second direction 2D extends in a different direction from the first direction 1D, the length or width direction of the light path control member, and the third direction 3D extends in a different direction from the first and second directions For example, the first direction 1D may be defined as a longitudinal direction of the light path control member, the second direction 2D may be defined as a width direction of the light path control member perpendicular to the first direction 1D, and the third direction 3D may be defined as a thickness direction of the light path control member. Alternatively, the first direction 1D may be defined as a width direction of the light path control member, the second direction 2D may be defined as a length direction of the light path control member perpendicular to the first direction 1D, and the third direction 3D may be defined as a thickness direction of the light path control member.

Hereinafter, for convenience of explanation, the first direction 1D will be described in the length direction of the light path control member, the second direction 2D in the width direction of the light path control member, and the third direction 3D in the thickness direction of the light path control member.

Figure 2:
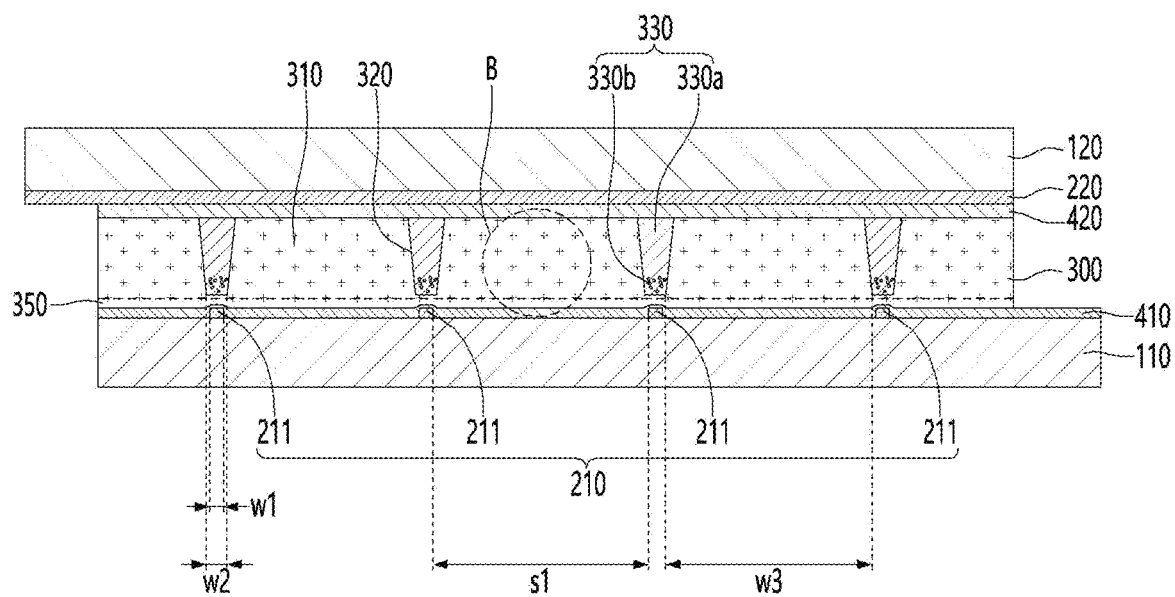
FIGS. 2 and 3 are cross-sectional views taken along area A-A' of FIG. 1.
Figure 3:
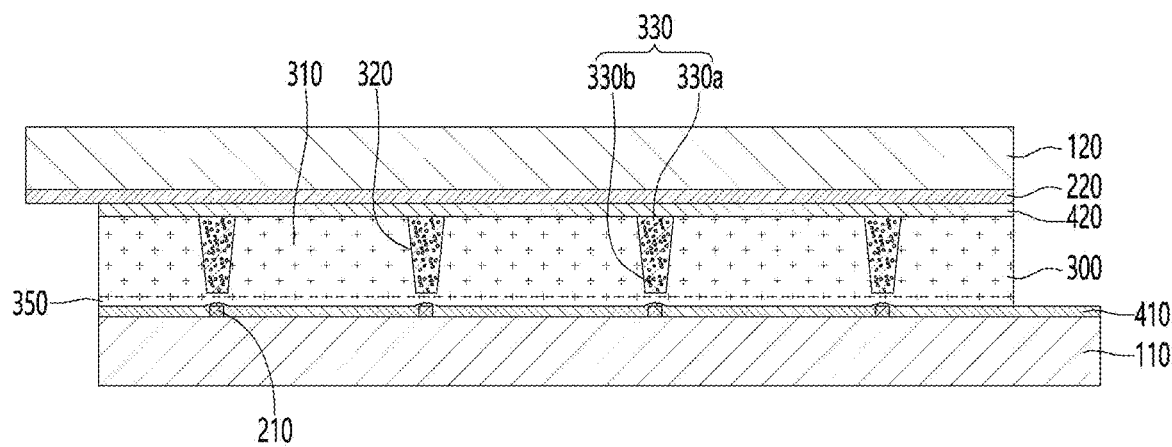

FIGS. 2 and 3 are cross-sectional views taken along area A-A' of FIG. 1.

Referring to FIGS. 2 and 3, the light conversion unit 300 may include a plurality of partition wall portions 310, a plurality of accommodating portions 320 and a base portion 350.

The light conversion part 300 includes a plurality of partition wall portions 310 and a plurality of accommodating portions 320. The partition wall portion 310 and the accommodating portion 320 may be alternately disposed. That is, one accommodating portion 320 may be disposed between two adjacent partition wall portions 310. In addition, one partition wall portion 310 may be disposed between two adjacent accommodating portions 320.

FIGS. 2 and 3 show only four accommodating portions for convenience of description. However, the light path control member according to the embodiment may include several to hundreds of accommodating portions.

The base portion 350 may be disposed below the accommodating portion 320. In detail, the base portion 350 may be disposed between the accommodating portion 320 and the buffer layer 410. Accordingly, the light conversion unit 300 may be bonded to the first electrode 210 by the base portion 350 and the buffer layer 410.

In addition, the adhesive layer 420 is disposed between the partition wall portion 310 and the second electrode 220. The light conversion unit 300 and the second electrode 220 may be bonded by the adhesive layer 420.

To form the partition wall portion 310 and the accommodating portion 320, a mold member process or an imprinting process is performed on a resin layer constituting the partition wall portion 310 and the accommodating portion 320. The base portion 350 is a region formed by the process. The base portion 350 may include the same material as the partition wall portion 310. That is, the base portion 350 and the partition wall portion 310 may be integrally formed.

The partition wall portion 310 may transmit light. In addition, light transmittance of the accommodating portion 320 may be changed by application of a voltage.

In detail, a light conversion material 330 may be disposed inside the accommodating portion 320. Light transmittance of the accommodating portion 320 may be changed by the light conversion material 330. The light conversion material 330 may include light conversion particles 330b that move when a voltage is applied and a dispersion liquid 330a dispersing the light conversion particles 330b. In addition, the light conversion material 300 may further include a dispersant that inhibits aggregation of the light conversion particles 330a.

The light conversion particles 330b inside the dispersion 330a may move by the application of the voltage. For example, referring to FIG. 2, the surfaces of the light conversion particles 330b inside the dispersion 330a are negatively charged. When a positive voltage is applied to the first electrode 210 and the second electrode 220, the light conversion particles 330b move toward the first electrode 210 or the second electrode 220. Accordingly, the accommodating portion 320 may become a light transmission part.

In addition, referring to FIG. 3, when a negative voltage is applied to the first electrode 210 and the second electrode 220, the light conversion particles 330b are again dispersed into the dispersion liquid 330a. Accordingly, the accommodating portion 320 may become a light blocking part.

Meanwhile, the first electrode 210 and the second electrode 220 are disposed under the light conversion unit to apply a voltage in the direction of the accommodating portion 320. However, charges also move toward the partition wall portion 310 of the light conversion unit by the first electrode 210 and/or the second electrode 220. Accordingly, charges may gradually accumulate on the surface of the partition wall portion 310 while repeatedly driving the light path control member.

Accordingly, when the light conversion particles inside the accommodating part 310 move, the movement of the light conversion particles may be hindered by charges on the surface of the partition wall portion. Thus, driving characteristics of the light path control member may be reduced.

The light path control member according to the embodiment described below solves the above problems by adjusting the position and size of the first electrode 210 and/or the second electrode 220.

Hereinafter, the light path control member according to the embodiment will be described with reference to FIGS. 2 to 5.

Referring to FIGS. 2 and 3, the first electrode 210 may include a plurality of first pattern electrodes 211 spaced apart from each other. That is, the first pattern electrodes 211 may be spaced apart from each other.

Also, although not shown in the drawing, the second electrode 220 may also include pattern electrodes. In detail, the second electrode 220 may include a plurality of second pattern electrodes spaced apart from each other.

Hereinafter, the arrangement and size of the first electrode 210 will be mainly described. The description of the first electrode 210 may be equally applied to the second electrode 220.

Since the first electrode patterns 211 are spaced apart from each other, a region where the first electrode 210 is disposed and a region where the first electrode 210 is not disposed are formed under the light conversion unit 300.

In detail, the first electrode pattern 211 may be disposed to overlap with the accommodating portion 320 and not overlap with the partition wall portion 310.

Figure 4:
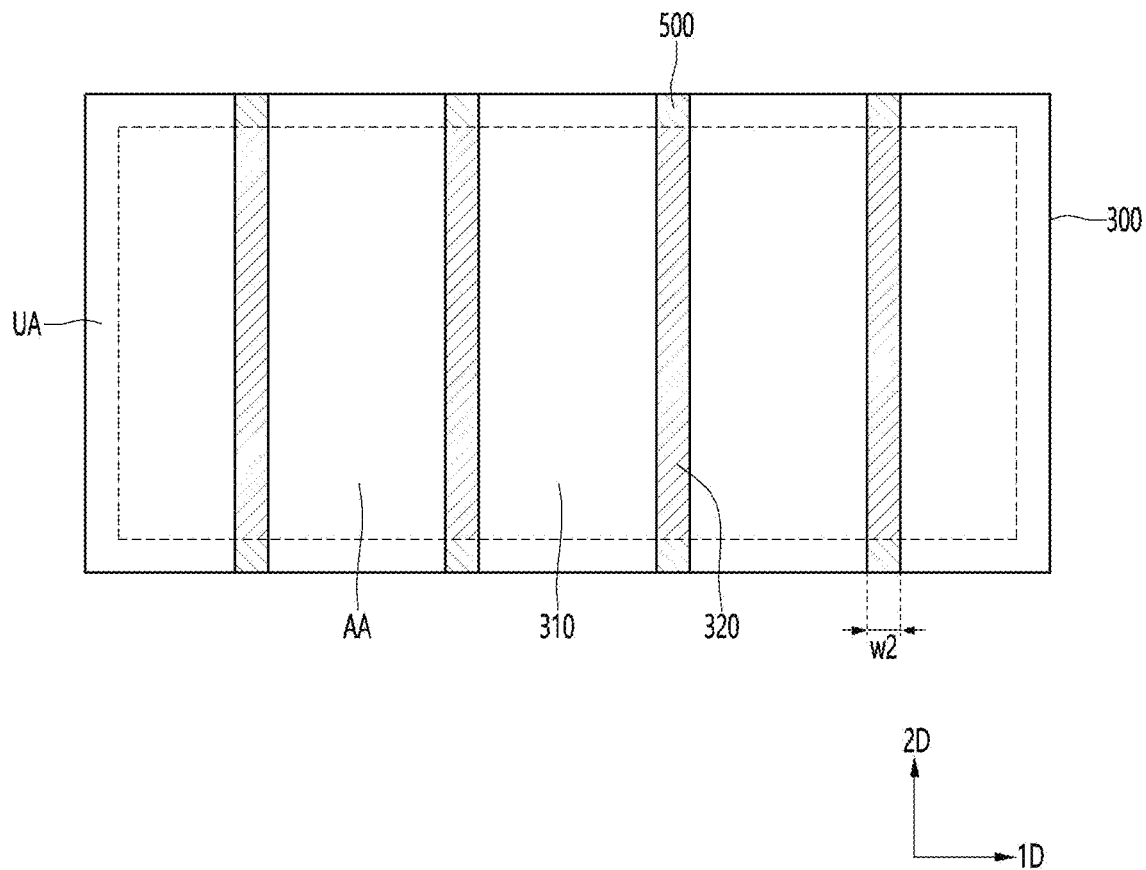
FIG. 4 is a plan view for explaining the arrangement of the accommodating portion of the light conversion unit of the light path control member according to the embodiment.
Figure 5:
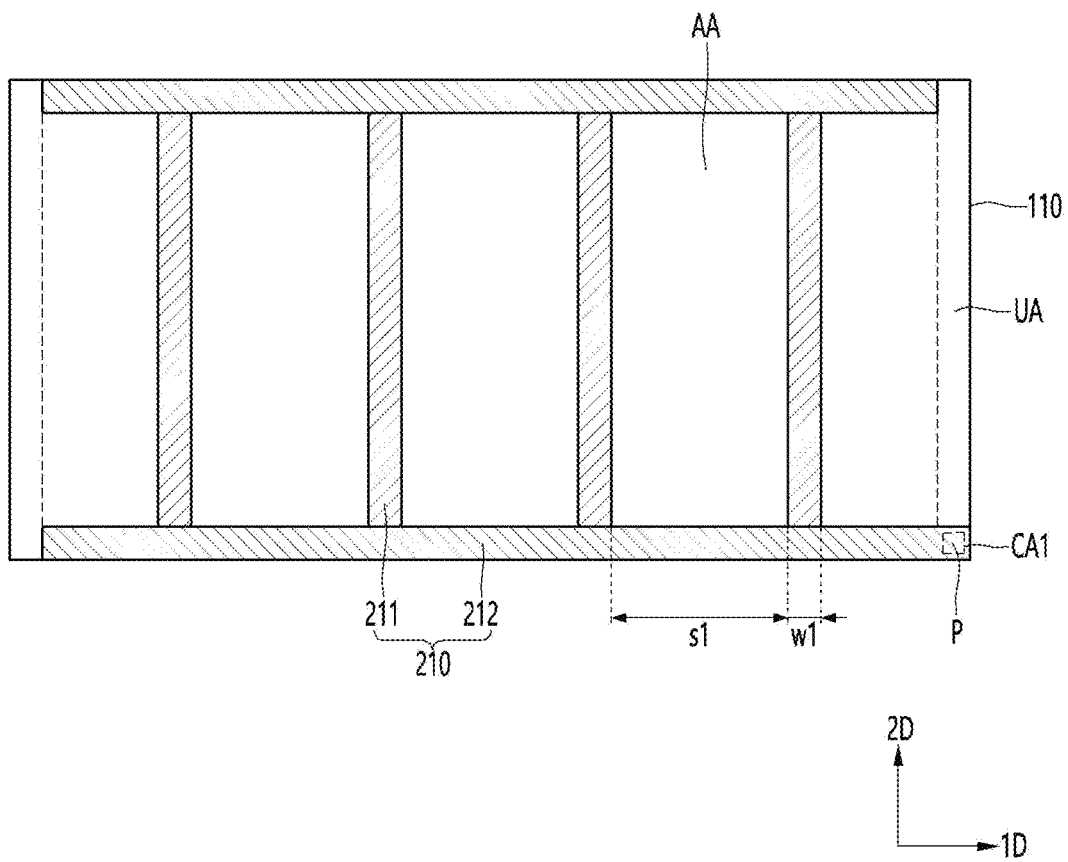
FIG. 5 is a plan view for explaining a first electrode disposed on a first substrate of the light path control member according to the embodiment.

FIG. 4 is a plan view of the light conversion unit for explaining the arrangement of the accommodating portion of the light conversion unit of the light path control member according to the embodiment. FIG. 5 is a plan view for explaining the arrangement of the first electrode on the first substrate of the light path control member according to the embodiment.

Referring to FIG. 4, the accommodating portion 320 of the light conversion unit 300 may be disposed extending in one direction. In addition, the accommodating portion 320 may be spaced apart from each other in one direction by the partition wall portion 310. In detail, each accommodating portion 320 may extend in the second direction 2D, and the plurality of accommodating portions 320 may be spaced apart in the first direction 1D.

The light conversion unit 300 may include an active area AA and a non-active area UA. The active area may be defined as a region in which the accommodating portion 320 accommodating the light conversion material is disposed. The non-active area UA may be defined as a region in which the sealing part 500 for sealing the light conversion material is disposed.

Also, referring to FIG. 5, the first pattern electrode 211 may be disposed extending in one direction. In addition, the first pattern electrodes 211 may be spaced apart in one direction. In detail, each of the first pattern electrodes 211 may be disposed while extending in the second direction 2D, and the plurality of first pattern electrodes 211 may be disposed apart from each other in the first direction 1D.

That is, the first pattern electrode 211 may extend in the same direction as the accommodating portion 320 and may be spaced apart from each other in the same direction. In detail, the first pattern electrode 211 may be disposed in the active area AA, extend in the same direction as the accommodating portion 320, and be spaced apart in the same direction.

Accordingly, the first substrate 110 may include a first region where the first pattern electrode 211 is disposed and a second region where the first pattern electrode 211 is not disposed. In detail, the first substrate 110 may include the first region in which the first pattern electrode 211 and the buffer layer 410 are stacked and disposed, and the second region in which only the buffer layer 410 is disposed. That is, the second region may be defined as an interval between the first pattern electrodes 211.

Since the first pattern electrodes 211 are spaced apart from each other on the first substrate 110, the buffer layer 410 on the first substrate 110 may be disposed while surrounding the first pattern electrode 211.

An area ratio of the first region and an area ratio of the second region to the total area of the first substrate 110 may be different.

In detail, the area ratio of the first region may be smaller than the area ratio of the second region. For example, the area ratio of the first region to the total area of the first substrate 110 may be 10% to 45%. In detail, the area ratio of the first region to the total area of the first substrate 110 may be 15% to 40%. In more detail, the area ratio of the first region to the total area of the first substrate 110 may be 20% to 35%.

Also, the area ratio of the second region to the total area of the first substrate 110 may be 55% to 90%. In detail, the area ratio of the second region to the total area of the first substrate 110 may be 60% to 85%. In more detail, the area ratio of the second region to the total area of the first substrate 110 may be 65% to 80%.

Since the first electrode pattern 211 extends in the same direction as the accommodating portion 320 and is spaced apart in the same direction as described above, based on the third direction 3D of the light path control member, the first pattern electrode 211 and the accommodating portion 320 may overlap. In detail, the first pattern electrode 211 and the accommodating portion 320 overlap in the third direction 3D, and the first pattern electrode 211 and the partition wall portion 310 overlap in the third direction 3D does not overlap.

In detail, a width w1 of the first pattern electrode 211 may be equal to or less than a width w2 of the lower part of the accommodating portion 320. Preferably, in order for the first pattern electrode 211 to be disposed inside the accommodating portion 320, the width w1 of the first pattern electrode 211 may be smaller than the width w2 of the lower part of the accommodating part 320.

In addition, the interval s1 between the first pattern electrodes 211 may be greater than a width w3 of the lower part of the partition wall portion 310.

Since the first pattern electrode 211 overlaps only the accommodating portion 320 and does not overlap with the partition wall portion 320, it is possible to minimize the movement of charges by the first electrode 210 in the direction of the partition wall portion 320.

Accordingly, it is possible to inhibit charges from remaining and accumulating on the surface of the partition wall portion 310 when the light path control member is repeatedly driven. Accordingly, when the light conversion particles 330b inside the accommodating portion 310 move, the influence of the surface charge of the partition wall portion 310 may be minimized.

Accordingly, the light path control member according to the embodiment may have improved driving characteristics.

Meanwhile, referring to FIG. 5, the first electrode 210 may include a first connection electrode 212. The first connection electrode 212 may be disposed below and/or above the first pattern electrode 211. In detail, the first connection electrode 212 may be disposed on the lower non-active area UA and/or the upper non-active area UA of the first pattern electrode 211. That is, the first connection electrode 212 may be disposed in the non-active area of the first substrate 100, that is, a bezel area, not a light conversion area.

The first connection electrode 212 may be disposed while being connected to the plurality of first pattern electrodes 211. Accordingly, the plurality of first pattern electrodes 211 may be electrically connected by the first connection electrode 212.

In detail, the first electrode 210 includes a first connection region CA1 formed on the first connection electrode 212, and the first connection electrode 212 may be connected to an external printed circuit board or a flexible printed circuit board in the first connection region CA1. In detail, the first connection electrode 212 may include a pad part P to be connected to the printed circuit board in the first connection region CAL and the first connection electrode 212 may be connected to an external printed circuit board by the pad part P.

Hereinafter, the light path control member according to another embodiment will be described with reference to FIGS. 6 and 7. In the description of the light path control member according to another embodiment, the same or similar description as the light path control member according to the above-described embodiment will be omitted, and the same reference numerals will be assigned to the same components.

Figure 6:
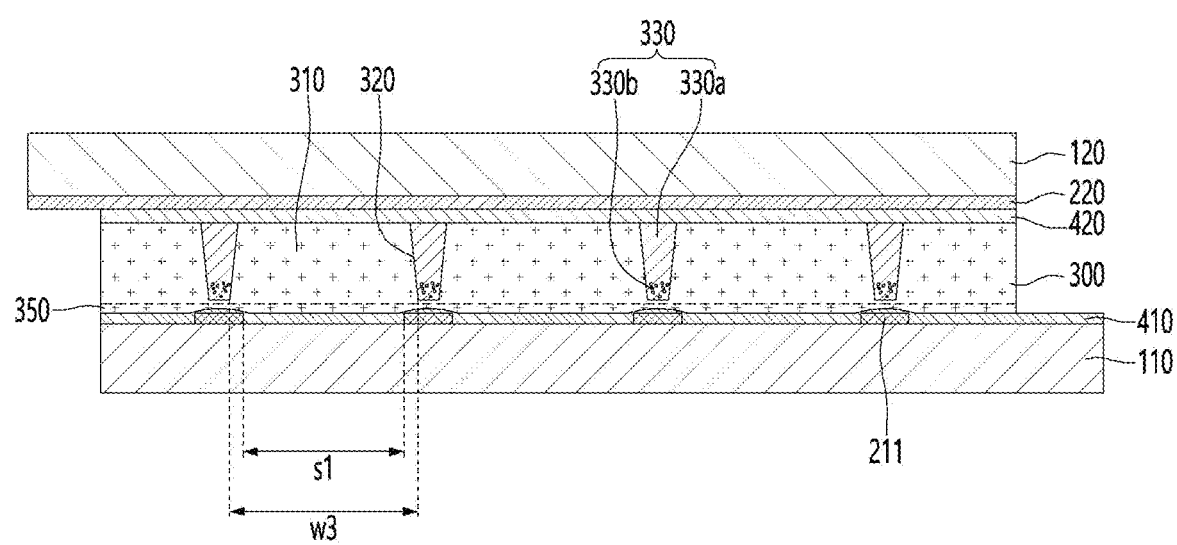
FIG. 6 is another cross-sectional view taken along line A-A' of FIG. 1.
Figure 7:
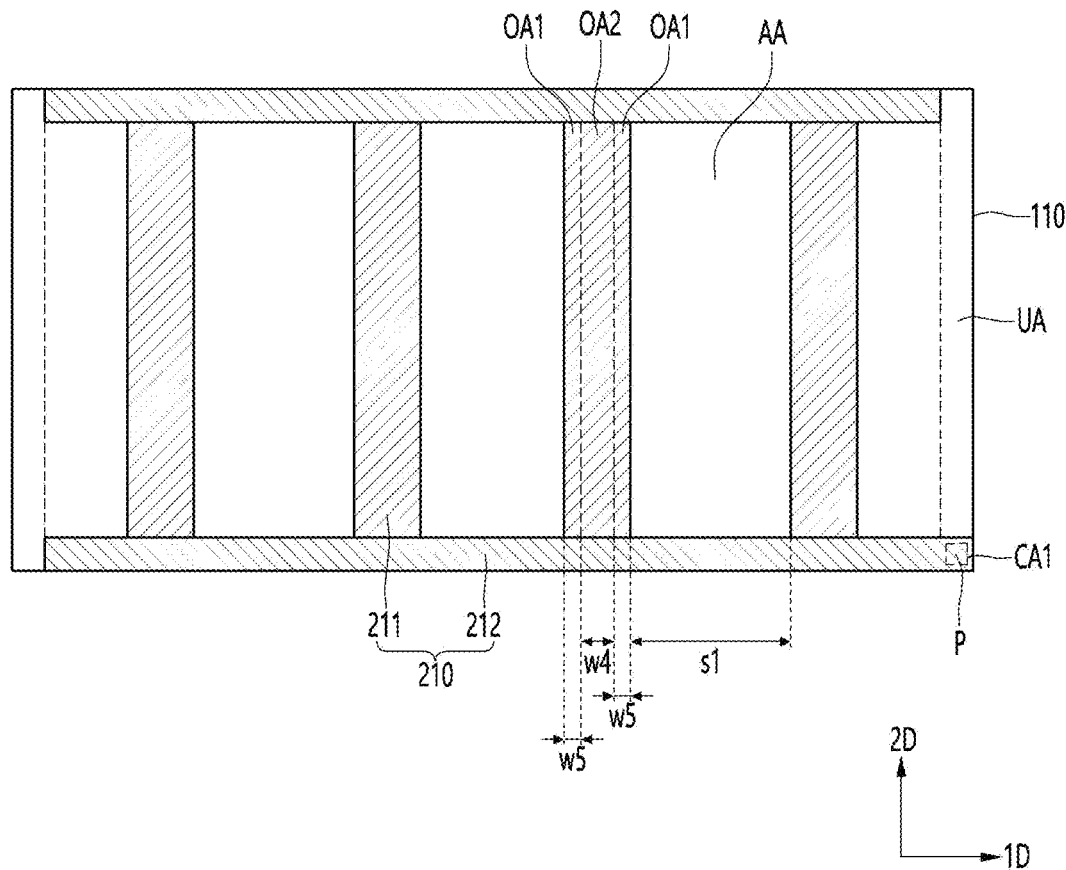
FIG. 7 is another plan view for explaining the first electrode disposed on the first substrate of a light path control member according to another embodiment.

Referring to FIGS. 6 and 7, the first pattern electrode 211 may overlap both the partition wall portion 310 and the accommodating portion. In detail, the first pattern electrode 211 may overlap the partition wall portion 310 and the accommodating portion 320 in the third direction 3D.

That is, the first pattern electrode 211 may include a first overlapping region OA1 overlapping the partition wall portion 310 and a second overlapping region OA2 overlapping the accommodating portion 320. A width w4 of the first overlapping region OA1 and a width w5 of the second overlapping region OA2 may be different. In detail, the width w5 of the second overlapping region OA2 may be smaller than the width w4 of the first overlapping region OA1. That is, the width w4 of the first overlapping region OA1 may be greater than the width w5 of the second overlapping region OA2. That is, a region where the first pattern electrode 211 and the accommodating portion 320 overlap may be larger than a region where the first pattern electrode 211 and the partition wall portion 310 overlap.

In addition, the interval s1 between the first pattern electrodes 211 may be smaller than the width w3 of the lower part of the partition wall portion 310.

That is, a region where the first pattern electrode 211 and the accommodating portion 320 overlap may be larger than a region where the first pattern electrode 211 and the partition wall portion 310 overlap. Preferably, the first pattern electrode 211 completely overlaps the accommodating portion 320 and partially overlaps the partition wall portion 320.

The width of the partition wall portion 310 and the width of the accommodating portion 320 of the light conversion part 300 may be slightly changed during the manufacturing process. Accordingly, when the first pattern electrode 211 is disposed to have the same width as one accommodating portion 320, it may not completely overlap with another accommodating portion 320. Accordingly, the moving speed of the light conversion particles in each accommodating portion may vary.

Accordingly, the first electrode pattern 211 of the light path control member according to the embodiment is dis-posed wider than the width of the accommodating portion 320 so as to partially overlap the partition wall portion. Thereby, the above problems may be solved.

Hereinafter, the light path control member according to another embodiment will be described with reference to FIGS. 8 to 10. In the description of the light path control member according to another embodiment, the same or similar description as the light path control member according to the above-described embodiment will be omitted, and the same reference numerals will be assigned to the same components.

Figure 8:
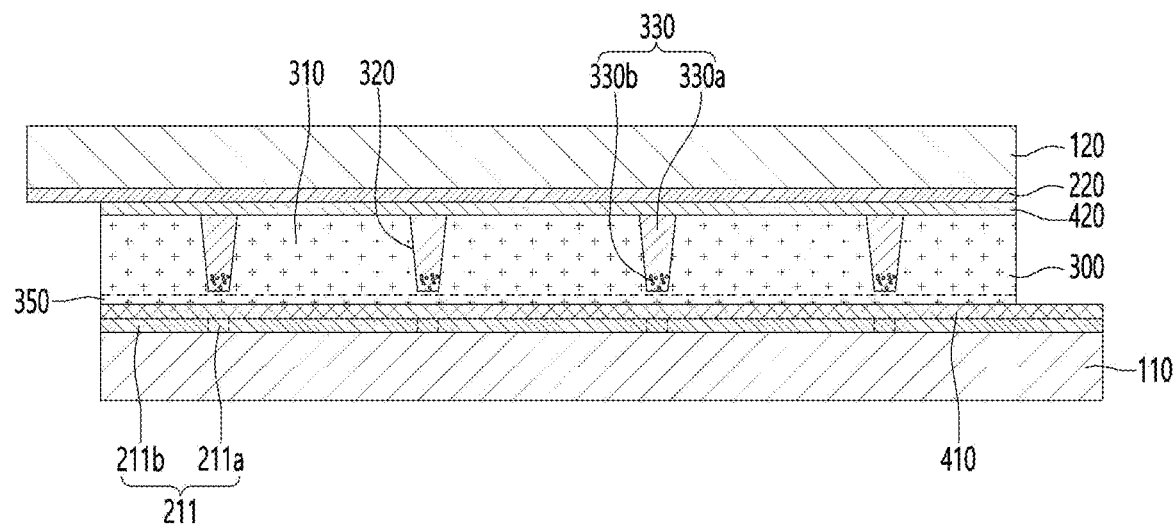
FIG. 8 is another cross-sectional view taken along line A-A' of FIG. 1.
Figure 9:
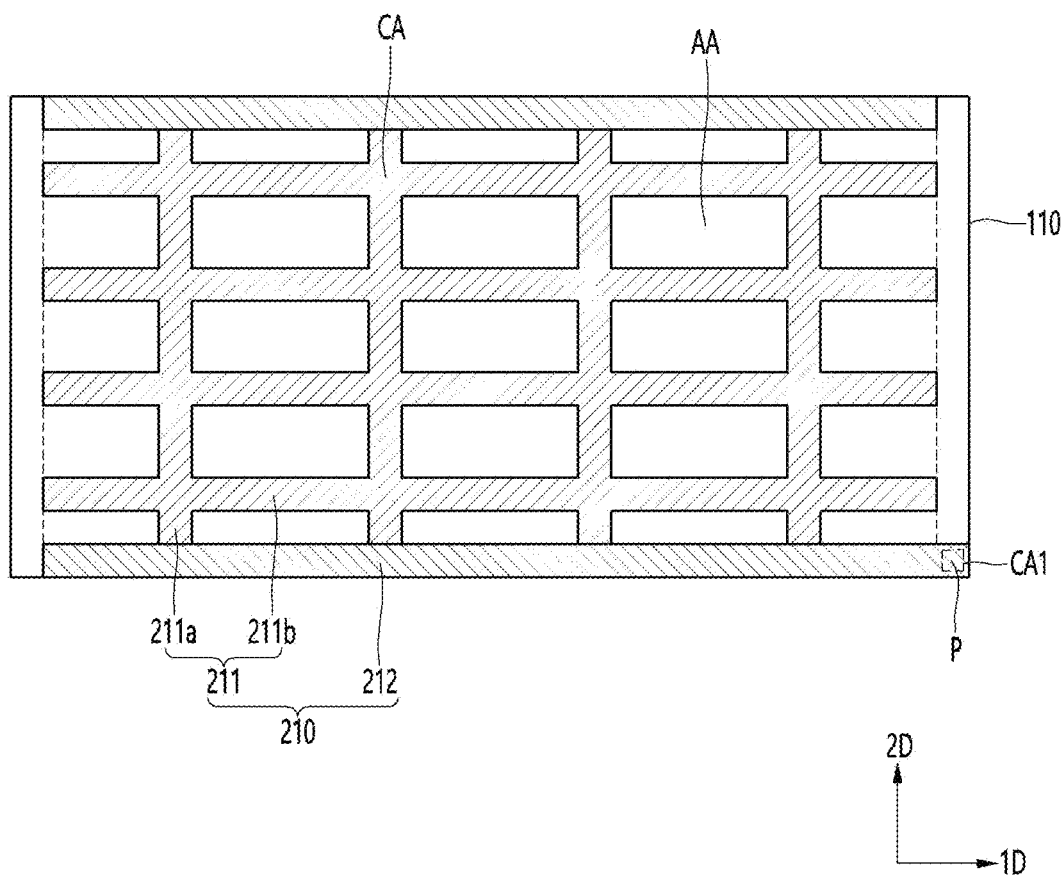
FIGS. 9 and 10 are other plan views for explaining the first electrode disposed on the first substrate of a light path control member according to another embodiment.

Referring to FIGS. 8 and 9, the first pattern electrode 211 may overlap both the partition wall portion 310 and the accommodating portion 320. In detail, the first pattern electrode 211 may overlap the partition wall portion 310 and the accommodating portion 320 in the third direction 3D.

In detail, the first pattern electrode 211 may include a 1-1 pattern electrode 211a and a 1-2 pattern electrode 211b. The 1-1 pattern electrode 211a and the 1-2 pattern electrode 211b may extend in different directions.

The 1-1 pattern electrode 211a extends in the same direction as the accommodating portion 310 and the 1-2 pattern electrode 211b extends in a different direction from the accommodating portion. For example, the 1-1 pattern electrode 211a may extend in the second direction 2D and the 1-2 pattern electrode 211b may extend in the first direction 1D.

Accordingly, the 1-1 pattern electrode 211a overlaps the accommodating portion 320, and the 1-2 pattern electrode 211b overlaps both the partition wall portion 310 and the accommodating portion 320.

The 1-1 pattern electrode 211a and the 1-2 pattern electrode 211b may be disposed while crossing each other to form an intersection region CA. For example, the first electrode 210 may be entirely disposed in a mesh shape by the 1-1 pattern electrode 211a and the 1-2 pattern electrode 211b.

Accordingly, the light path control member may increase an area of the first electrode 210 disposed under the light conversion unit 300. Accordingly, the driving characteristics of the light path control member may be improved by increasing the moving speed of charge or amount of charge moving in the direction of the accommodating portion 320.

In detail, the 1-1 pattern electrode 211a is disposed to overlap the accommodating portion. Accordingly, a contact area between the 1-2 pattern electrodes 211b and the partition wall portion 310 is minimized while a contact area between the first electrode 210 and the accommodating portion 320 is maximized. As a result, more charges move in the direction of the accommodating portion, and the minimum amount of charges moves in the direction of the partition wall portion.

Accordingly, the driving speed and driving characteristics of the light path control member may be improved.

Figure 10:
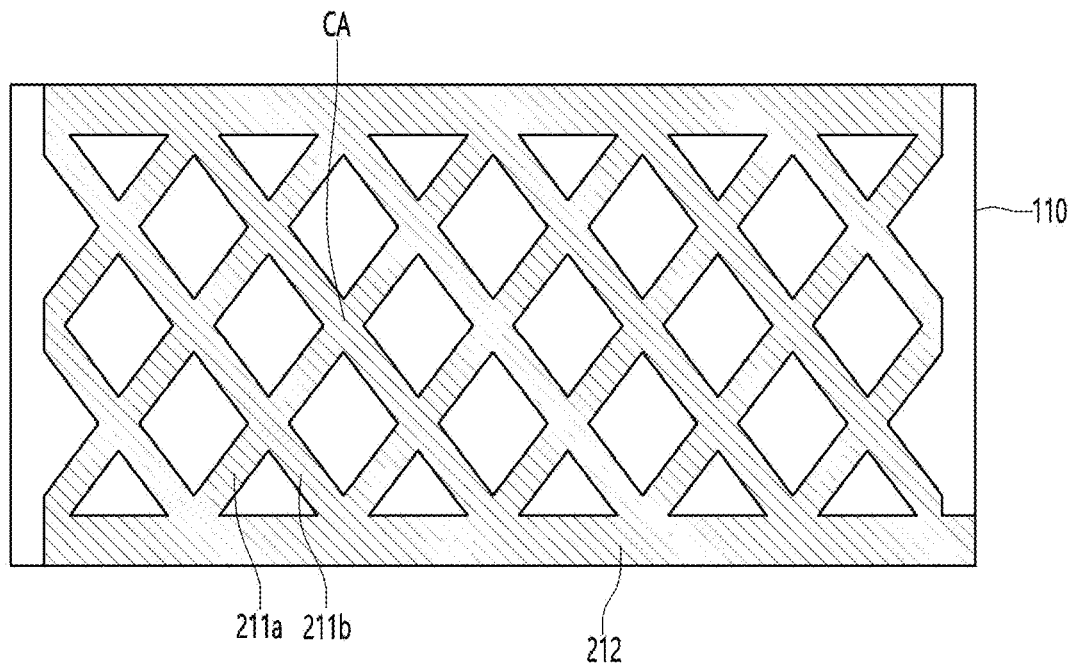

Meanwhile, referring to FIG. 10, the 1-1 pattern electrode 211a and the 1-2 pattern electrode 211b may be tilted with respect to the second direction 2D.

In detail, the 1-1 pattern electrode 211a and the 1-2 pattern electrode 211b may be tilted at an angle of 10° or less with respect to the second direction 2D. In this case, the 1-1 pattern electrode 211a and the 1-2 pattern electrode 211b may be tilted in different directions.

Accordingly, the 1-1 pattern electrode 211a and the 1-2 pattern electrode 211b may be disposed while crossing each other to form an intersection region CA. For example, the first electrode 210 may be entirely disposed in a mesh shape by the 1-1 pattern electrode 211a and the 1-2 pattern electrode 211b.

Since the 1-1 pattern electrode 211a and the 1-2 pattern electrode 211b are tilted, respectively, when the light path control member and the panel are coupled, moiré phenomenon due to overlapping the pixel pattern of the panel and the pattern of the light path control member may be reduced.

Hereinafter, the light path control member according to another embodiment will be described with reference to FIGS. 11 and 12. In the description of the light path control member according to another embodiment, the same or similar description as the light path control member according to the above-described embodiment will be omitted, and the same reference numerals will be assigned to the same components.

Figure 11:
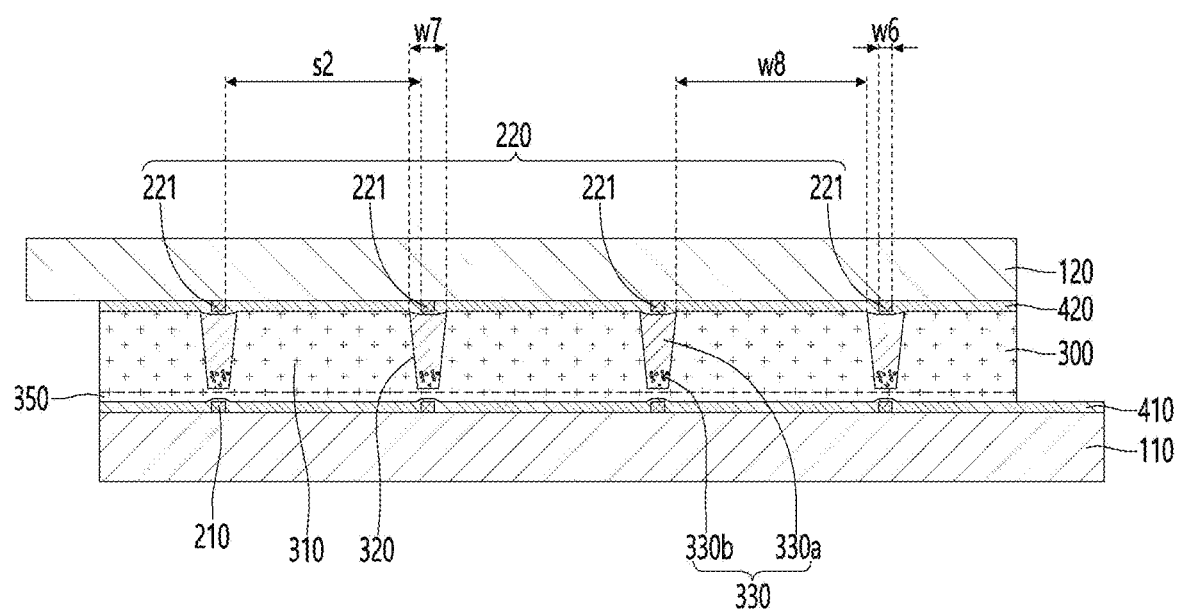
FIG. 11 is another cross-sectional view taken along line A-A' of FIG. 1.
Figure 12:
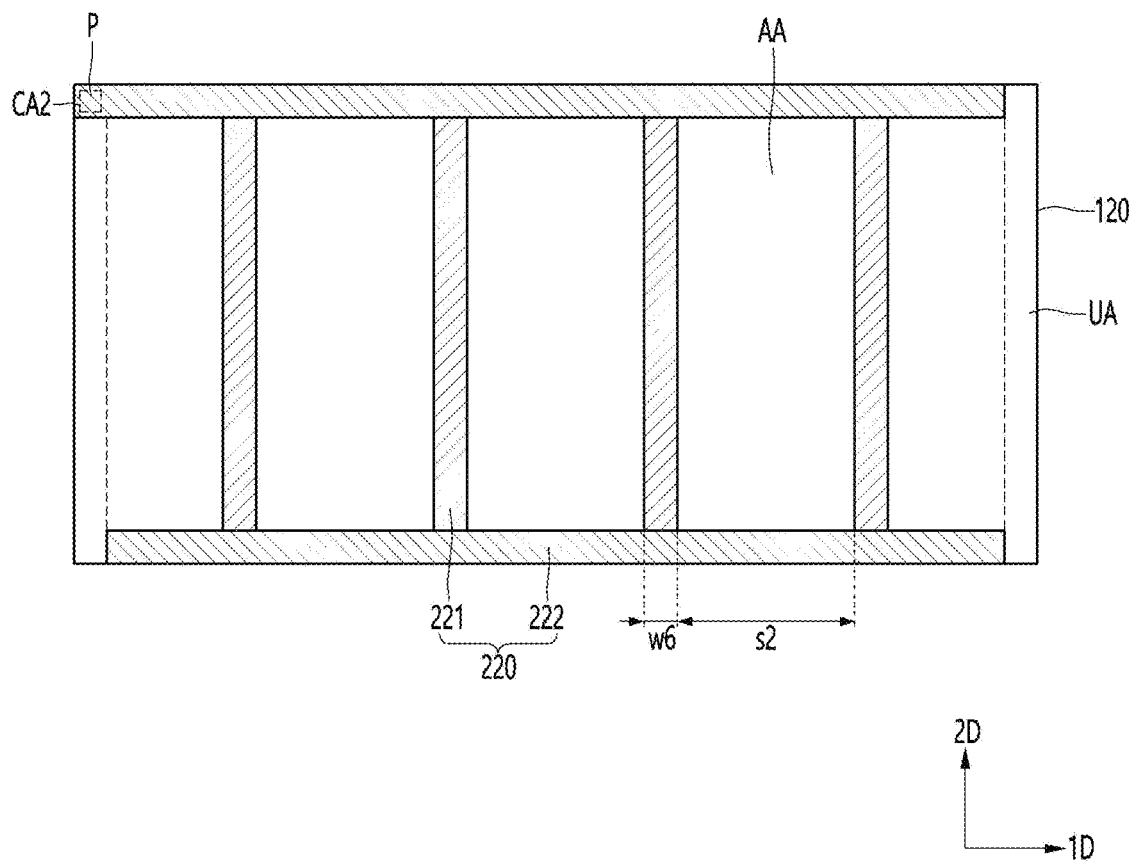
FIG. 12 is another plan view for explaining a second electrode disposed on a second substrate of a light path control member according to another embodiment.

Referring to FIGS. 11 and 12, the light path control member may include a second pattern electrode 221. In detail, the second electrode 220 may also include the second pattern electrode 221 in the same way as the first electrode 210.

The second pattern electrode 221 may include a plurality of second pattern electrodes 221 spaced apart from each other. That is, the second pattern electrodes 221 may be spaced apart from each other.

Since the second electrode patterns 221 are spaced apart from each other, the upper portion of the light conversion unit 300 may include a region where the second electrode 220 is disposed and a region where the second electrode 220 is not disposed.

In detail, the second electrode pattern 221 may overlap the accommodating portion 320 and may not overlap the partition wall portion 310.

The second pattern electrode 221 may extend in one direction. In addition, the second pattern electrodes 221 may be spaced apart in one direction. In detail, each second pattern electrode 221 extends in the second direction 2D, and the plurality of second pattern electrodes 221 are spaced apart in the first direction 1D.

That is, the second pattern electrode 221 extends in the same direction as the accommodating portion 320 and is spaced apart in the same direction. In detail, the second pattern electrode 221 may be disposed in the active area AA, extend in the same direction as the accommodating portion 320, and be spaced apart in the same direction.

Accordingly, the second substrate 120 may include a third region where the second pattern electrode 221 is disposed and a fourth region where the second pattern electrode 221 is not disposed. In detail, the second substrate 120 may include the third region in which the second pattern electrode 221 and the adhesive layer 420 are stacked, and the fourth region in which only the adhesive layer 420 is disposed. That is, the fourth region may be defined as an interval between the second pattern electrodes 221.

Since the second pattern electrodes 221 are spaced apart from each other under the second substrate 120, the adhesive layer 420 under the second substrate 120 may be disposed while surrounding the second pattern electrode 221.

An area ratio of the third region and an area ratio of the fourth region to the total area of the second substrate 120 may be different.

In detail, the area ratio of the third region may be smaller than the area ratio of the fourth region. For example, the area ratio of the third region to the total area of the second substrate 120 may be 10% to 45%. In detail, the area ratio of the third region to the total area of the second substrate 120 may be 15% to 40%. In more detail, the area ratio of the third region to the total area of the second substrate 120 may be 20% to 35%.

Also, the area ratio of the fourth region to the total area of the second substrate 120 may be 55% to 90%. In detail, the area ratio of the fourth region to the total area of the second substrate 120 may be 60% to 85%. In more detail, the area ratio of the fourth region to the total area of the second substrate 120 may be 65% to 80%.

Since the second electrode pattern 221 extends in the same direction as the accommodating portion 320 and is spaced apart in the same direction as described above, based on the third direction 3D of the light path control member, the second pattern electrode 221 and the accommodating portion 320 may overlap. In detail, the second pattern electrode 221 and the accommodating portion 320 overlap in the third direction 3D, and the second pattern electrode 221 and the partition wall portion 310 overlap in the third direction 3D does not overlap.

In detail, a width w6 of the second pattern electrode 221 may be equal to or less than a width w7 of the upper part of the accommodating portion 320. Preferably, in order for the second pattern electrode 221 to be disposed inside the accommodating portion 320, the width w6 of the second pattern electrode 221 may be smaller than the width w7 of the upper part of the accommodating part 320.

In addition, the interval s2 between the second pattern electrodes 221 may be greater than a width w8 of the upper part of the partition wall portion 310.

Alternatively, the width w6 of the second pattern electrode 221 may greater than the width w7 of the upper part of the accommodating portion 320, and the interval s2 between the second pattern electrodes 221 may be smaller than the width w8 of the upper part of the partition wall portion 310.

Since the second pattern electrode 221 overlaps only the accommodating portion 320 and does not overlap with the partition wall portion 320, it is possible to minimize the movement of charges by the second electrode 220 in the direction of the partition wall portion 320.

Accordingly, it is possible to inhibit charges from remaining and accumulating on the surface of the partition wall portion 310 when the light path control member is repeatedly driven. Accordingly, when the light conversion particles 330b inside the accommodating portion 310 move, the influence of the surface charge of the partition wall portion 310 may be minimized.

Accordingly, the light path control member according to the embodiment may have improved driving characteristics.

Meanwhile, the second electrode 220 may include a second connection electrode 222. The second connection electrode 222 may be disposed below and/or above the second pattern electrode 221. In detail, the second connection electrode 222 may be disposed on the lower non-active area UA and/or the upper non-active area UA of the second pattern electrode 221.

The second connection electrode 222 may be disposed while being connected to the plurality of second pattern electrodes 221. Accordingly, the plurality of second pattern electrodes 221 may be electrically connected by the second connection electrode 222.

In detail, the second electrode 220 includes a second connection region CA2 formed on the second connection electrode 222, and the second connection electrode 222 may be connected to an external printed circuit board or a flexible printed circuit board in the second connection region CA2. In detail, the second connection electrode 222 may include a pad part P to be connected to the printed circuit board in the second connection region CA2, and the second connection electrode 222 may be connected to an external printed circuit board by the pad part P.

Hereinafter, the light path control member according to another embodiment will be described with reference to FIGS. 13 and 14. In the description of the light path control member according to another embodiment, the same or similar description as the light path control member according to the above-described embodiment will be omitted, and the same reference numerals will be assigned to the same components.

Figure 13:
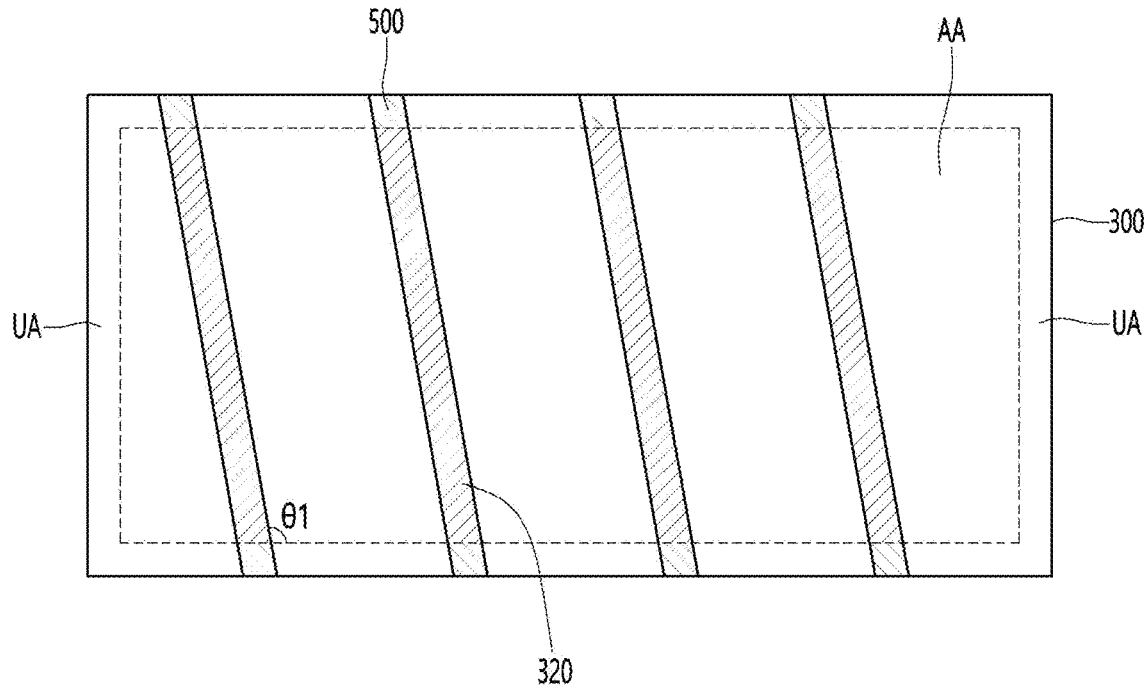
FIG. 13 is a plan view for explaining the arrangement of the accommodating portion of the light conversion unit of the light path control member according to another embodiment.
Figure 14:
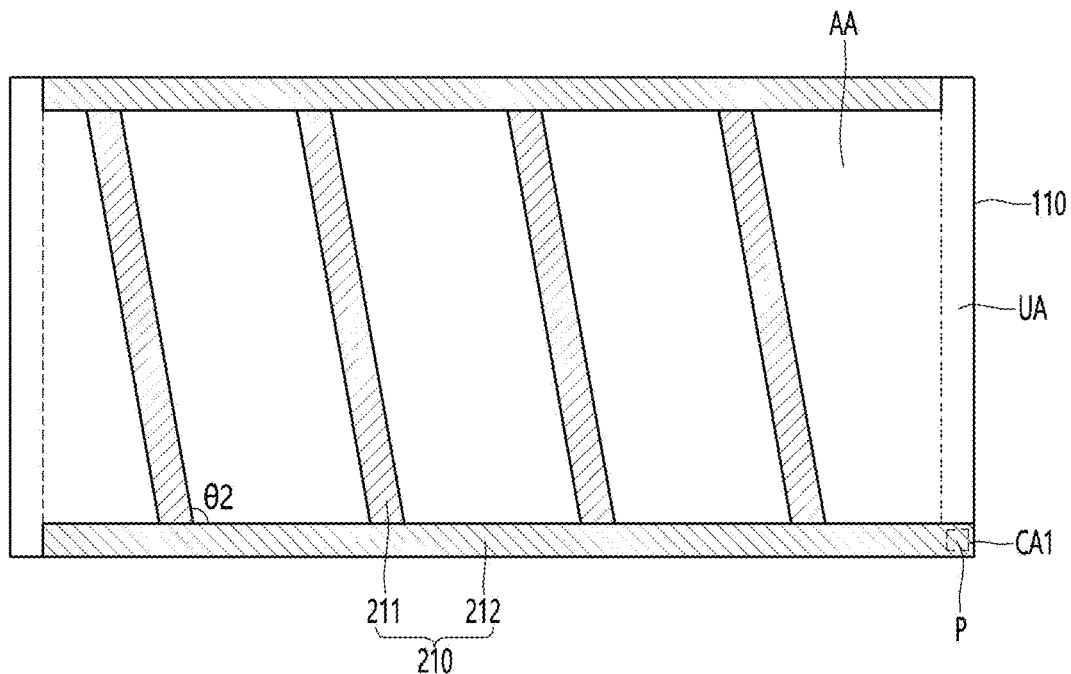
FIG. 14 is another plan view for explaining the first electrode disposed on the first substrate of a light path control member according to another embodiment.

Referring to FIGS. 13 and 14, the accommodating portion 320 of the light conversion unit and the first electrode 210 may be tilted.

In detail, the accommodating portion 320 may be tilted at a first angle θ1 having an acute angle with respect to the second direction 2D. In addition, the first pattern electrode 211 may be tilted at a second angle θ2 having an acute angle with respect to the second direction 2D. The first angle θ1 and the second angle θ2 may be the same or similar.

Accordingly, the accommodating portion 320 of the light conversion part and the first electrode 210 may be tilted and overlap each other.

Meanwhile, although not shown in the drawing, the second electrode pattern 221 of the second electrode 220 may also be tilted at a third angle. Also, the third angle may be the same as or similar to the first angle θ1 and the second angle θ2.

Since the extension direction of the accommodating portion and the first electrode pattern is inclined in an acute angle range, when the light path control member is applied to the display device, it is possible to inhibit a moire phenomenon due to overlapping of the accommodating portion pattern, the first and second electrode patterns, and patterns of other members.

In detail, when the light path control member is applied to the display device by combining the light path control member with the display panel, since the accommodating portion and the first and second electrode patterns are tilted in a certain angular range, a moiré phenomenon due to overlapping of the pattern and the pattern of the display panel may reduce. Accordingly, the visibility of the display device may be improved.

In the light path control member according to the embodiment, electrodes disposed under or above the light conversion unit are disposed as a plurality of patterned electrodes spaced apart from each other.

The pattern electrodes overlap only the accommodating portion of the light conversion unit. Alternatively, an overlapping region of the pattern electrode and the accommodating portion is greater than an overlapping region of the pattern electrode and the partition wall portion. Accordingly, it is possible to minimize charges moving in the direction of the partition wall portion by the lower electrode or the upper electrode . . . .

Accordingly, the light path control member according to the embodiment may minimize the movement of the light conversion particles moving in the accommodating portion from being hindered by charges accumulated on the surface of the partition wall portion.

Accordingly, in the light path control member according to the embodiment, the amount of charge remaining on the surface of the partition wall portion is minimized even when the light path control member is repeatedly driven. Accordingly, driving characteristics and life of the light path control member may be improved.

Hereinafter, the light path control member according to another embodiment will be described with reference to FIGS. 15 to 25(b).

Figure 15:
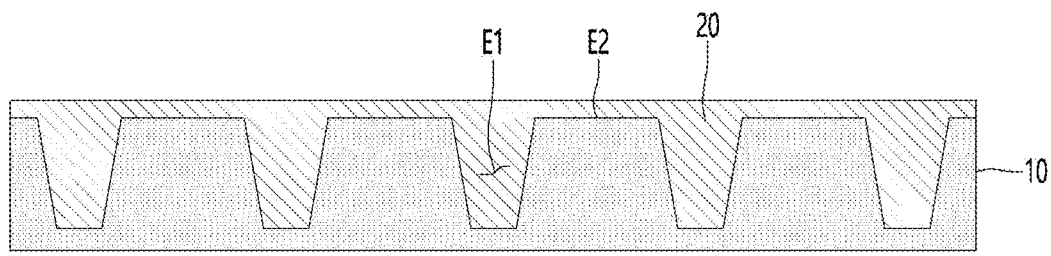
FIGS. 15 to 17 are views for explaining a process of forming a partition wall portion and an accommodating portion of a light conversion unit according to the embodiment.
Figure 16:
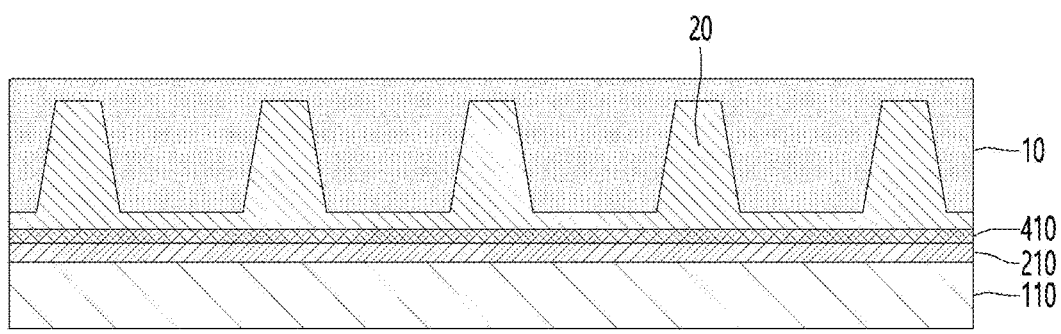
Figure 17:
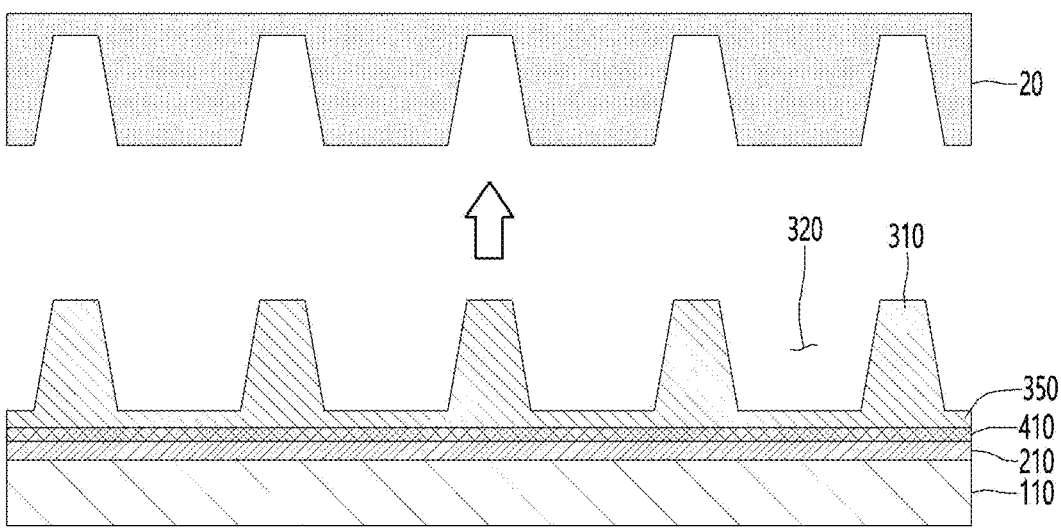

FIGS. 15 to 17 are views for explaining a process of forming the light conversion unit 300.

Referring to FIG. 15, first, a mold member 10 including a concave portion E1 and an convex portion E2 is prepared. The mold member 10 may be formed in a shape complementary to that of the light conversion unit. In detail, the shape of the concave portion E1 may correspond to the shape of the partition wall portion 310 of the light conversion unit 300. The convex portion E2 may correspond to the shape of the accommodating portion 320 of the light conversion unit 300.

Subsequently, the resin composition 20 may be filled in the mold member 10. In detail, the resin composition 20 may cover the upper surface of the convex portion E2 while filling the concave portion E1 of the mold member 10. The resin composition 20 may include a urethane-based resin composition, which will be described in detail below.

Subsequently, referring to FIG. 16, the mold member 10 filled with the resin composition 20 and the first substrate 110 are bonded.

In detail, after disposing the first electrode 210 on the first substrate 110 described above and disposing the buffer layer 410 on the first electrode 210, the buffer layer 410 and the resin composition on the upper surface of mold member 10 is adhered.

Subsequently, referring to FIG. 17, the mold member 10 is released from the resin composition 20. Accordingly, the light conversion part 300, formed by the resin composition 20, including the partition wall portion 310, the accommodating portion 320, and the base portion 350, is disposed on the buffer layer 410.

At this time, when the release property of the resin composition is small, the thickness and width of the partition wall portions 310 may change when the mold member 10 is released from the resin composition 20. Thereby, the shape of the partition wall portions may not be uniform.

Accordingly, the resin composition 20 may include a release agent for improving release characteristics. Release properties of the resin composition may be improved by the release agent. Therefore, the resin composition may be easily released from the mold member 10.

Meanwhile, as the release agent added to the resin composition, volatile organic compounds are used. Accordingly, the release agent may be partially volatilized during operation of the light path control member or by an external environment. Also, the solvent in which the release agent is dissolved may be volatilized together with the release agent.

Accordingly, a volume of the light conversion unit 300 may be reduced due to volatilization of the release agent component. Also, adhesive strength may be reduced at an interface between the light conversion unit 300 and the buffer layer 410 or at an interface between the light conversion unit 300 and the adhesive layer 420. Accordingly, the light conversion unit 300 may be separated from the buffer layer 410 or the adhesive layer 420.

Figure 18:
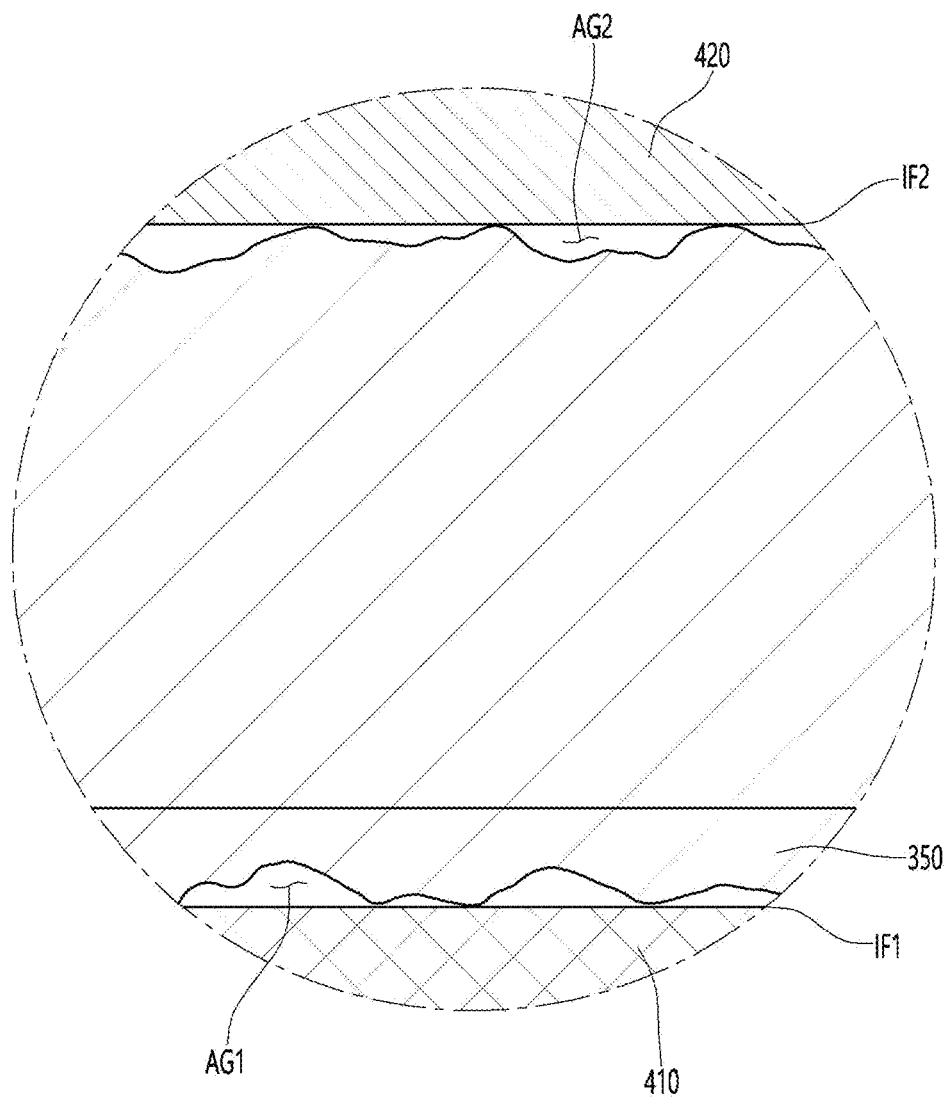
FIG. 18 is an enlarged view of region B of FIG. 2.

FIG. 18 is an enlarged view of area B of FIG. 2. Referring to FIG. 18, the light conversion unit 300 may be bonded to the buffer layer 410 and the adhesive layer 420. In detail, the base portion 350 may be bonded to the buffer layer 410 and the partition wall portion 310 may be bonded to the adhesive layer 420.

Accordingly, the light conversion unit 300 may include a first interface IF1 between the base portion 350 and the buffer layer 410 and a second interface IF2 between the partition wall portion 310 and the adhesive layer 420.

Heat may be transferred to the light path control member when the light path control member is driven or by a driving environment of the light path control member. When the heat is transferred to the inside of the light path control member, a part of the release agent of the light conversion unit 300 may be volatilized by the heat.

As a result, as shown in FIG. 18, a lifting phenomenon may occur at the first interface IF1 and the second interface IF2. That is, a first gap region AG1 in which the base portion 350 and the buffer layer 410 do not contact may be formed in the first interface IF1. In addition, a second gap region AG2 in which the partition wall portion 310 and the adhesive layer 420 do not contact may be formed in the second interface IF2.

The driving characteristics of the light path control member may be reduced because the flow of current moving to the light conversion material inside the accommodating portion is not smooth due to the first air region AG1 and the second air region AG2. In addition, light may leak to the outside due to the gap region at the edge of the light path control member. As a result, light transmittance may be reduced.

Accordingly, the light path control member according to the embodiment controls the characteristics of release agents in the composition of the resin composition forming the light conversion unit. Accordingly, the formation of the first air region AG1 and the second air region AG2 is minimized.

In detail, the resin composition forming the light conversion unit 300 may include an oligomer, a monomer, a photoinitiator, and additives. A prepolymer in the form of a polymer, a multi-functional monomer as a diluent, and a photoinitiator react, and the resin composition is cured by light to form the light conversion part.

For example, the resin composition may include a urethane acrylate polymer.

That is, the oligomer may include urethane acrylate.

Also, the monomer may include at least one monomer. In detail, the monomer may include a single monomer or a plurality of monomers. For example, the monomer may include at least one of an acrylate monomer, HEA, BMA, 2-PEA, CTFA, IBOA, EOEOEA, IDA, TPGDA, TCDDMDA, BPA3EODA and BPA4EODA.

In addition, a known photoinitiator for UV curing may be used as the photoinitiator.

Oligomers, monomers, photoinitiators, and additives included in the resin composition are included in different weight %, respectively.

In detail, the oligomer may be included in an amount of 40% to 60% by weight based on the total weight of the resin composition.

In addition, the monomer may be included in an amount of 30% to 40% by weight based on the total weight of the resin composition.

In addition, the photoinitiator may be included in an amount of 0.1% to 5% by weight based on the total weight of the resin composition.

In addition, the additive may be included in an amount of 0.1% to 5% by weight based on the total weight of the resin composition.

The additive may be added to form the light conversion unit or to improve driving characteristics of the light path control member. For example, the additive may include a release agent and an antistatic agent. The release agent improves release characteristics of the light conversion unit. Thereby, the light conversion unit may be easily formed.

In addition, the antistatic agent may improve driving characteristics of the light path control member by controlling electrical characteristics of the partition wall portion of the light conversion unit. In detail, the antistatic agent may improve electrical conductivity by reducing the volume resistance and surface resistance of the partition wall portion. That is, it is possible to inhibit charging by moving the charges accumulated inside the partition wall portion to an external conductive material (moisture).

As described above, since the release agent among the additives includes volatile organic compounds, it is volatilized during operation of the light path control member or by an external environment. Accordingly, driving characteristics and transmittance of the light path control member may be reduced.

To solve this problem, the resin composition according to the embodiment may include the release agent having a high molecular weight. In detail, the resin composition may include the release agent having a molecular weight of 500 g/mol or more. In more detail, the resin composition may include the release agent having a molecular weight of 500 g/mol to 5000 g/mol.

When the molecular weight of the release agent is less than 500 g/mol, volatilization of the release agent increases during driving of the light path control member or due to a high temperature in the external environment. Accordingly, the porosity of the base portion and the partition wall portion of the light path control member may be increased. Accordingly, driving characteristics and transmittance of the light path control member may be reduced.

Since the light path control member according to the embodiment uses a material having a molecular weight of 500 g/mol or more as a release agent, the porosity of a region between the light conversion unit and the buffer layer or the porosity of a region between the light conversion unit and the adhesive layer may be 10% or less. In detail, the porosity of a region between the base of the light conversion unit and the buffer layer or the porosity of a region between the upper part of the partition wall portion of the light conversion unit and the adhesive layer may be 50% or less. In more detail, the porosity of a region between the base of the light conversion unit and the buffer layer or the porosity of a region between the upper part of the partition wall portion of the light conversion unit and the adhesive layer may be 40% or less. In more detail, the porosity of a region between the base of the light conversion unit and the buffer layer or the porosity of a region between the upper part of the partition wall portion of the light conversion unit and the adhesive layer may be 30% or less. In more detail, the porosity of a region between the base of the light conversion unit and the buffer layer or the porosity of a region between the upper part of the partition wall portion of the light conversion unit and the adhesive layer may be 20% or less. In more detail, the porosity of a region between the base of the light conversion unit and the buffer layer or the porosity of a region between the upper part of the partition wall portion of the light conversion unit and the adhesive layer may be 10% or less.

The release agent may include a non-reactive release agent including siloxane. For example, the non-reactive release agent may include a Si-containing material such as PDMS.

The non-reactive release agent may include a material in which a functional group is bonded to polydimethylsiloxane. The non-reactive release agent may include a material in which one or more functional groups are bonded to polydimethylsiloxane. The non-reactive release agent may include a material in which two or more identical or different functional groups are bonded to polydimethylsiloxane.

The non-reactive release agent may be a functional fluid in which a functional group is bonded to polydimethylsiloxane. In detail, the functional group bonded to the backbone of polydimethylsiloxane may include various materials such as an alkyl group, an aryl group, an allyl group, an alkenyl group, an amido group, an amino group, a fluoroalkyl group, a halide group, an epoxy group, a carboxy group, a hydroxyl group, an alkoxy group, or a methylhydrogen group. In addition, copolymers containing Si include siloxane-urethane copolymers, siloxane-polycarbonate copolymer, siloxane-polyester copolymer, siloxane-polyimide copolymer, acryloxymethylsiloxane, p-styrylsiloxane, a copolymer of silicone and aldehyde, or polysilformal.

That is, the resin composition according to the embodiment may include a release agent having a functional group bonded to polydimethylsiloxane and having a molecular weight of 500 g/mol or more, preferably, 500 g/mol to 5000 g/mol.

Accordingly, the release characteristics of the light conversion unit 300 formed of the resin composition according to the embodiment are improved by the release agent. Accordingly, when forming the light conversion unit, the shape and size of the partition wall portion and the accommodating portion may be uniform. In addition, since the volatilization rate of the release agent decreases at high temperatures, it is possible to inhibit separation of the light conversion unit and the buffer layer at high temperatures. Accordingly, reliability and electrical characteristics of the light path control member may be improved.

Hereinafter, the present invention will be described in more detail through the volatilization characteristics of the light conversion unit according to the molecular weight of the release agent of the resin composition forming the light conversion unit of the light path control member according to Examples and Comparative Examples. The above embodiment is presented as an example to explain the present invention in more detail. Therefore, the present invention is not limited by the above embodiment.

EXAMPLE

A resin composition is formed by mixing an oligomer containing urethane acrylate, a monomer, a photoinitiator, a release agent, and an antistatic agent.

In this case, the release agent includes a material having a molecular weight of 500 g/mol or more.

Subsequently, after preparing a mold member including a concave portion and a convex portion, the resin composition is filled in the concave portion of the mold member.

Subsequently, the first electrode including indium tin oxide (ITO) is disposed on the first substrate including polyethylene terephthalate (PET), the urethane-based buffer layer is disposed on the first electrode, and the mold member and the buffer layer are bonded.

Subsequently, the mold member and the resin composition are released to form a base portion, an embossed partition wall portion, and an intaglio accommodating portion on the buffer layer. Thereby, a light conversion unit is formed.

Subsequently, a second electrode including indium tin oxide (ITO) is disposed on a second substrate including polyethylene terephthalate (PET), and an adhesive layer including an optical transparent adhesive is disposed between the second electrode and the light conversion unit to adhere the second substrate. Thereby, the light path control member is manufactured.

Subsequently, the porosity formed in the region between the light conversion unit and the buffer layer and the driving characteristics of the light path control member are measured at a temperature of 85° C.

The porosity was measured under a microscope. The porosity was defined as a region in which the base portion of the light conversion unit and the buffer layer were separated from each other in a 50 µm*50 µm region of the cross section of the light path control member.

Comparative Example

The light path control member was formed in the same manner as in the Example, except that a material having a molecular weight of less than 500 g/mol was used as the release agent. Subsequently, the porosity formed in the region between the light conversion unit and the buffer layer and the driving characteristics of the light path control member are measured at a temperature of 85° C.

The porosity was measured under a microscope. The porosity was defined as a region in which the base portion of the light conversion unit and the buffer layer were separated from each other in a 50 µm*50 µm region of the cross section of the light path control member.

TABLE 1

|  | Edge region (%) | Lower region of accommodating portion (%) | Lower region of partition wall portion (%) |
| --- | --- | --- | --- |
| Example | 30 or less | 20 or less | 10 or less |
| Comparative example | 80 or more | Over 60 | Over 50 |

Referring to Table 1, it may be seen that the porosity of the light path control member according to Example is smaller than the porosity of the light path control member according to Comparative Example.

That is, it may be seen that the light path control member according to the embodiment has a porosity smaller than that of the light path control member according to the comparative example in the edge area of the bezel area, and the lower region of the accommodating portion and partition wall portion of the light conversion area.

Figure 19:
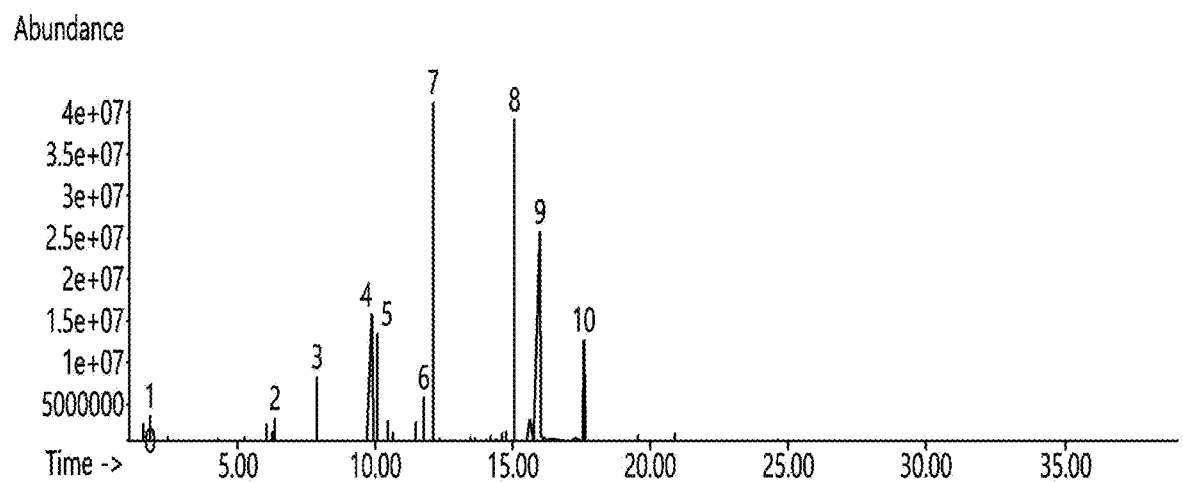
FIGS. 19 and 20 are views comparing volatile components of light conversion units according to the embodiment and the comparative example.
Figure 20:
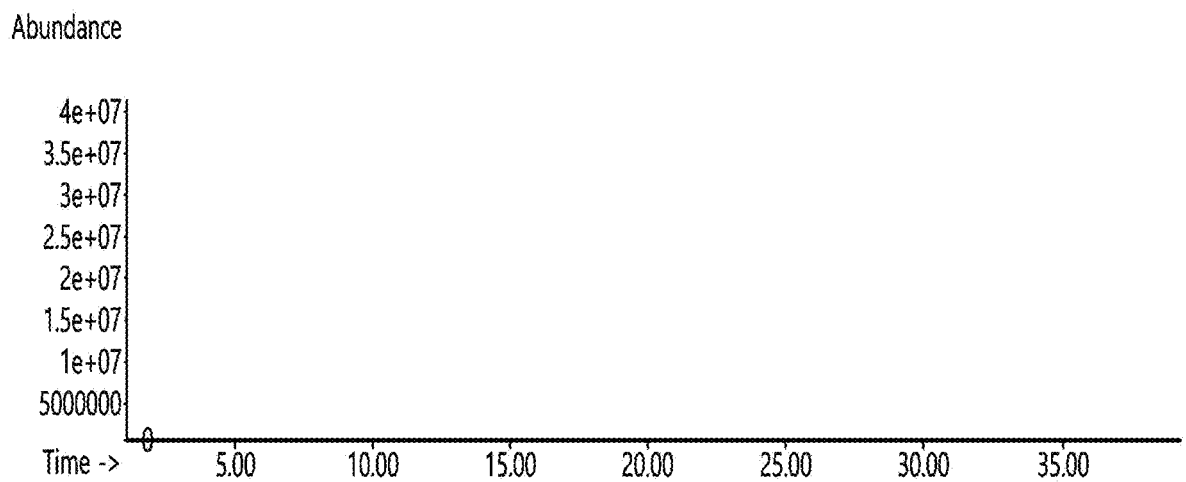

FIGS. 19 and 20 are graphs obtained by measuring the volatile component of the release agent of the light path control member according to the embodiment for 20 minutes at a temperature of 85° C. using TD-GCMS equipment.

Referring to FIG. 19, it may be seen that in the light path control member according to the comparative example, the release agent and a solvent component and other additive components are volatilized together with the release agent at a high temperature.

That is, it may be seen that the release agent components 3, 7, 8, and 10 and the solvent and other additive components 1, 2, 4 to 6, and 9 are volatilized.

However, referring to FIG. 20, the light path control member according to the embodiment may inhibit volatilization of the release agent even at a high temperature. Accordingly, volatilization of the release agent and other solvents and additive components volatilized together with the release agent may be inhibited.

Figure 21:
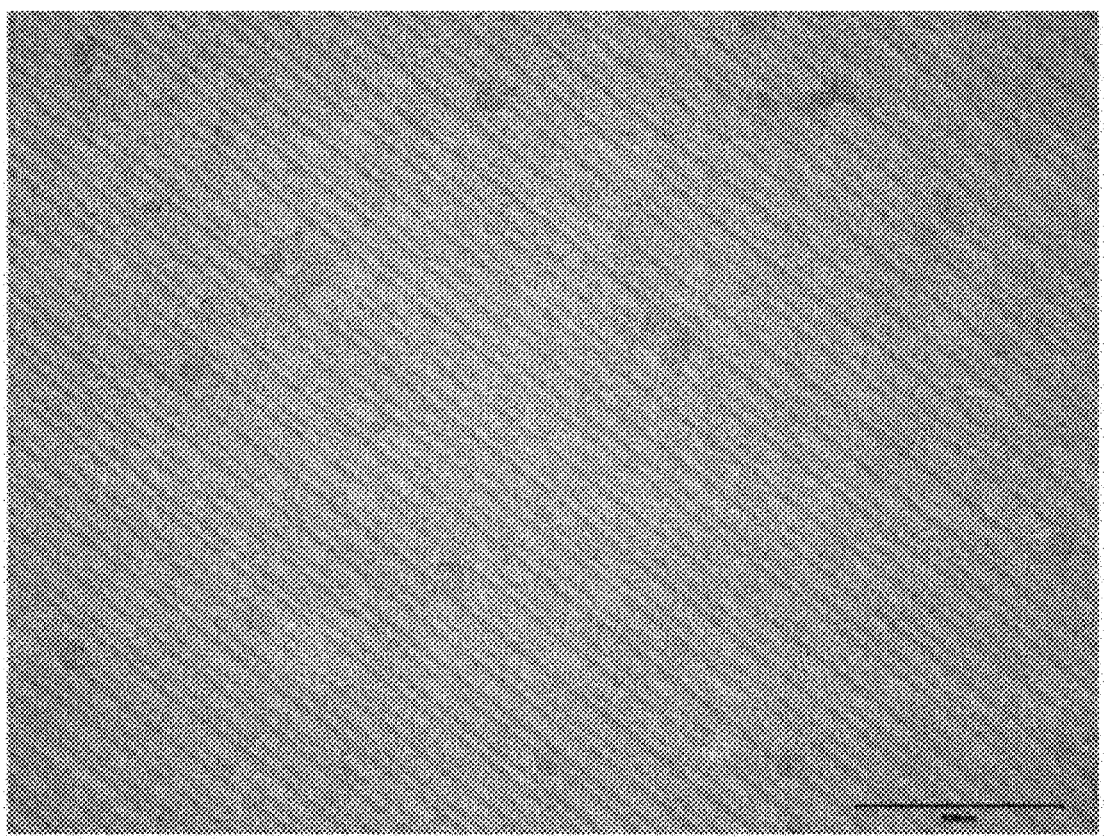
FIGS. 21 and 22 are views for explaining appearance stains of light conversion units according to the embodiment and the comparative example.
Figure 22:
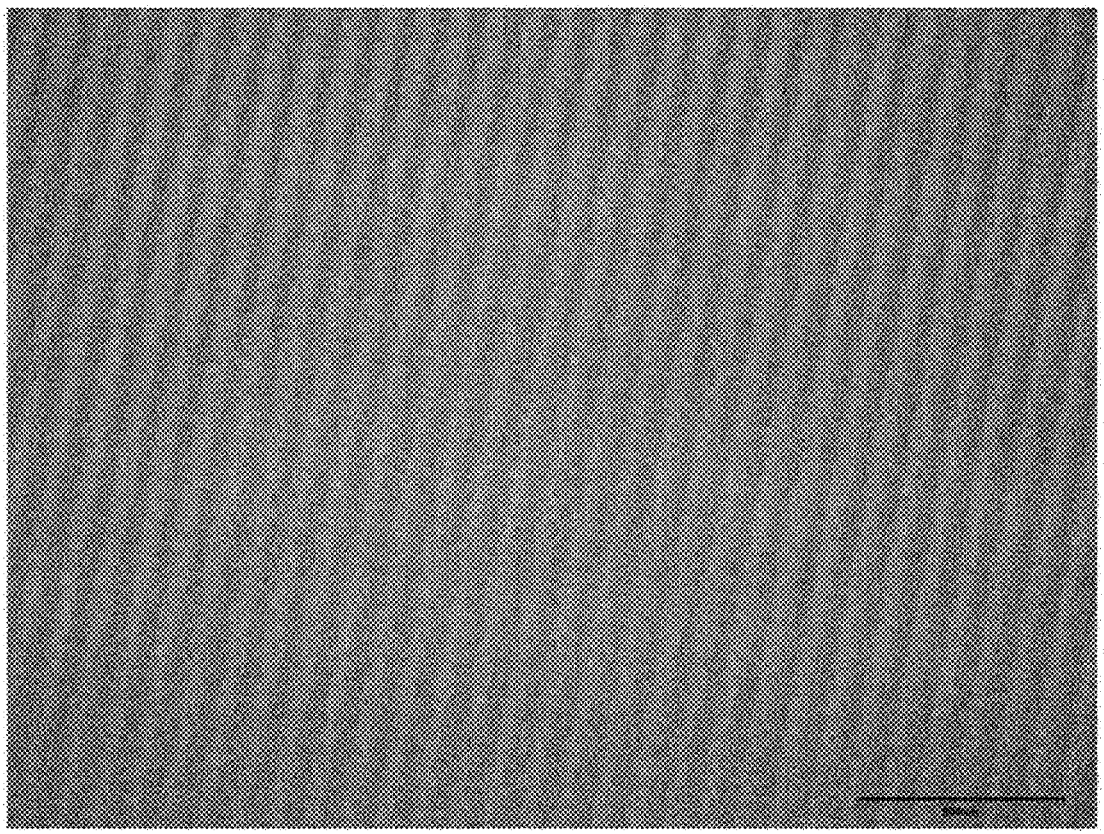

FIGS. 21 and 22 are graphs for explaining stain characteristics of light path control members according to Examples and Comparative Example.

Referring to FIG. 21, the light path control member according to the comparative example is recognized as a stain when the light path control member is viewed from the outside by a gap between the light conversion unit and the buffer layer or a gap between the light conversion unit and the adhesive layer.

However, Referring to FIG. 22, the light path control member according to the embodiment may minimize a gap between the light conversion unit and the buffer layer or a gap between the light conversion unit and the adhesive layer to minimize stains caused by gaps.

Figure 23:
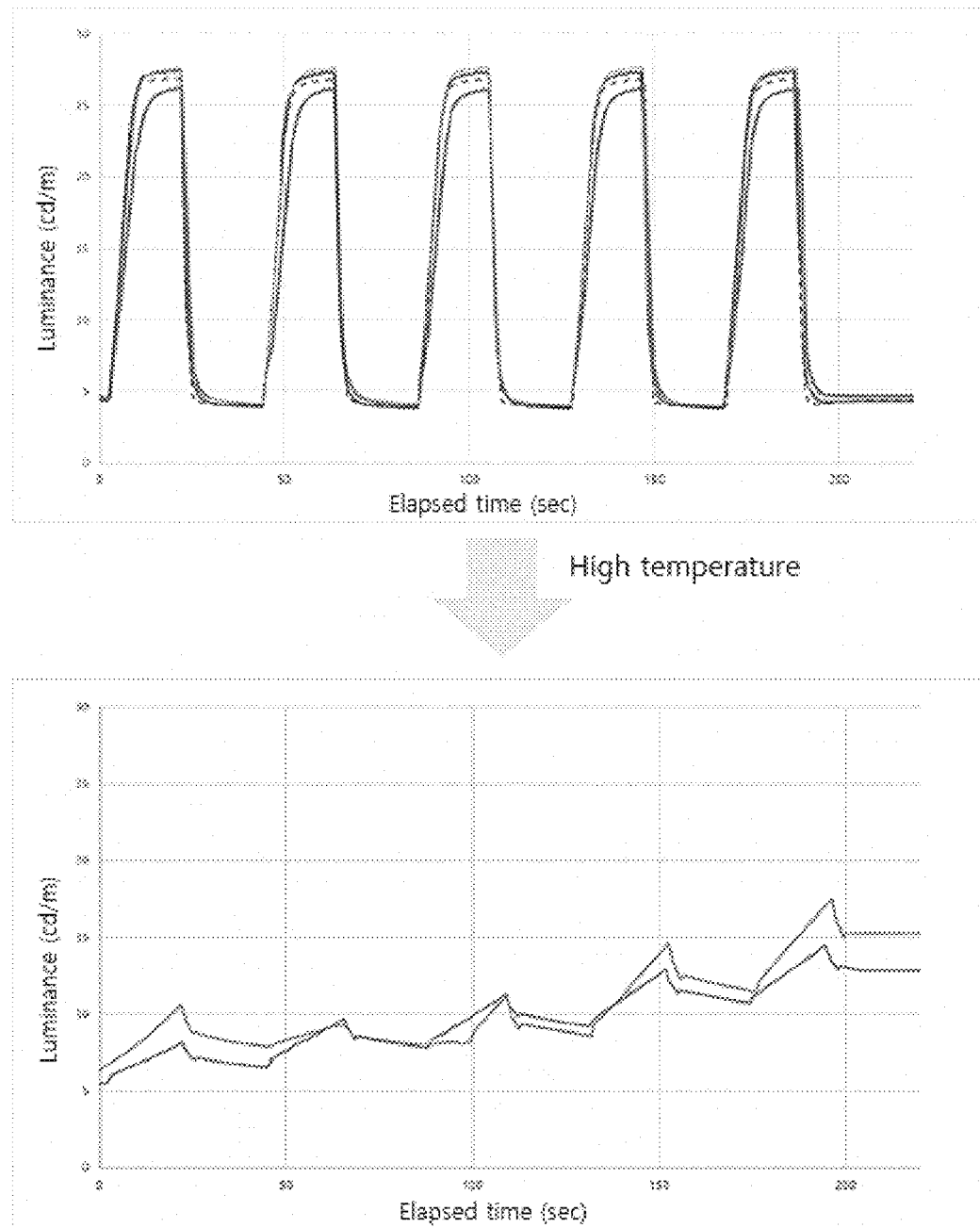
FIGS. 23 and 24 are views for explaining driving characteristics of a light conversion unit according to the embodiment and the comparative example.
Figure 24:
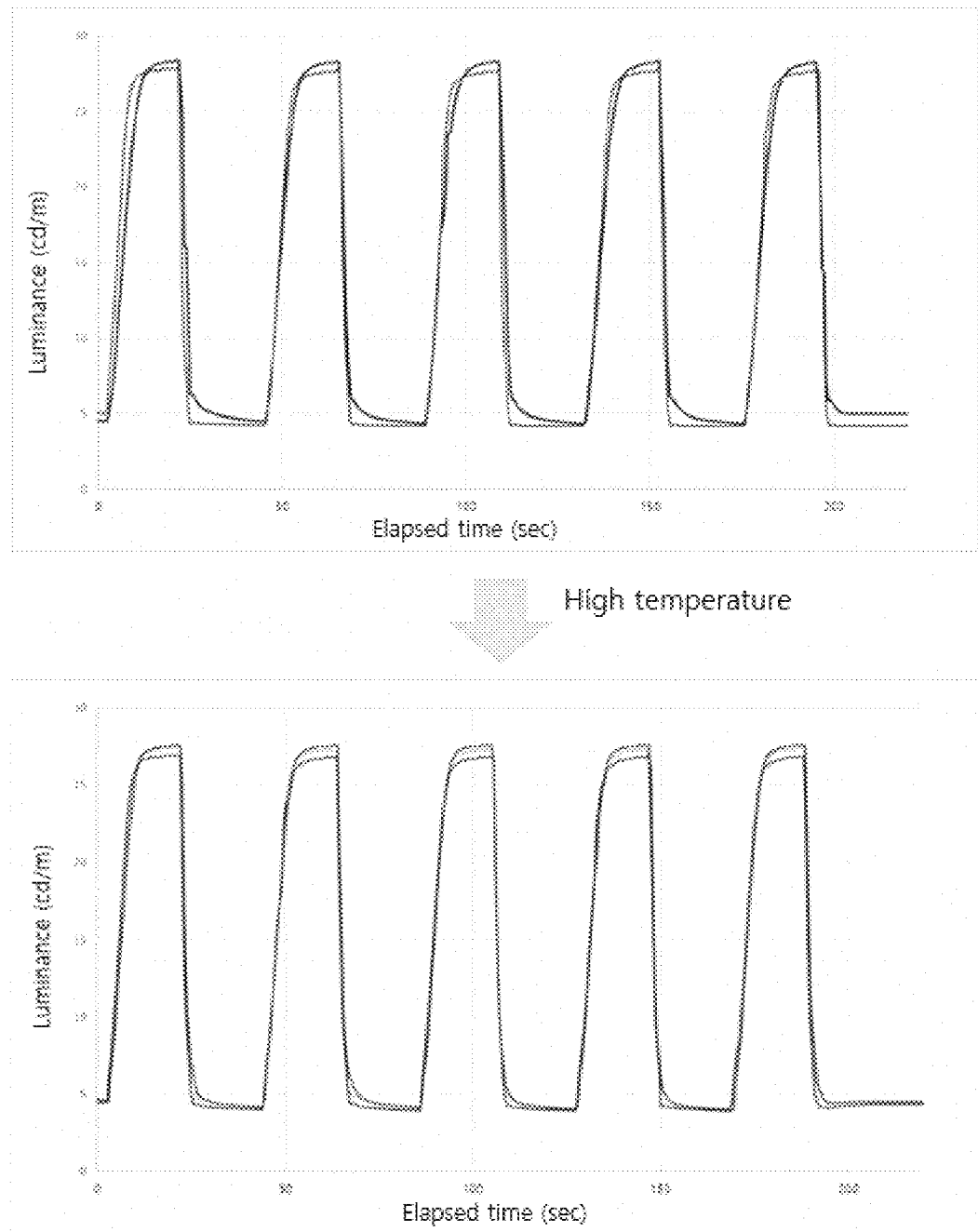

FIGS. 23 and 24 are views for explaining driving characteristics of light path control members according to Examples and Comparative Example.

Referring to FIG. 23, the light path control member according to Comparative Example reduces charge movement characteristics and increases resistance in the accommodating portion direction by a gap between the light conversion unit and the buffer layer at a high temperature or a gap between the light conversion unit and the adhesive layer. Thereby, the driving characteristics of the light path control member are reduced.

However, referring to FIG. 24, the light path control member according to the embodiment may minimize a gap between the light conversion unit and the buffer layer or a gap between the light conversion unit and the adhesive layer even at a high temperature. Thus, the driving characteristics of the light path control member may be maintained.

Figure 25A:
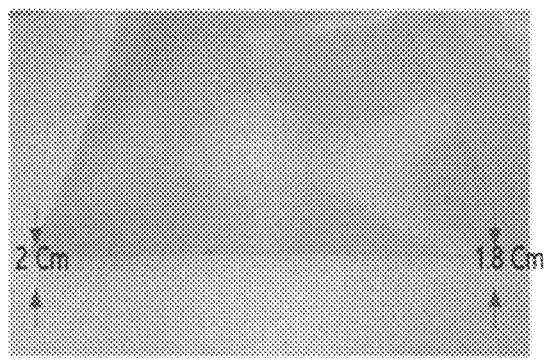
FIGS. 25(a) and 25(b) are views for comparing the peeling phenomenon of the side of the light path control member according to the embodiment and the comparative example.
Figure 25B:
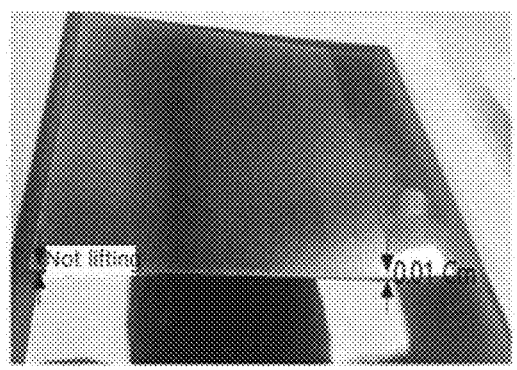

FIGS. 25(a) and 25(b) are views for comparing side lifting of light path control members according to Examples and Comparative Examples.

In detail, after manufacturing a light path control member having a width of 35 cm×length of 35 cm, the light path control member is disposed on a flat plate. Then, lifting between the first substrate and the second substrate was measured.

Referring to FIG. 25(a), it may be seen that the light path control member according to the embodiment does not lift or lifts to about 0.01 cm or less in the edge region.

However, referring to FIG. 25(b), it may be seen that the light path control member according to the comparative example is lifted by 1.8 cm or more in the edge region.

That is, lifting of the side of the light path control member according to the embodiment is reduced. Accordingly, penetration of external impurities may be inhibited and reliability of the light path control member may be improved.

Hereinafter, referring to FIGS. 26 to 30, a display device to which a light path control member according to the embodiment is applied will be described.

Figure 26:
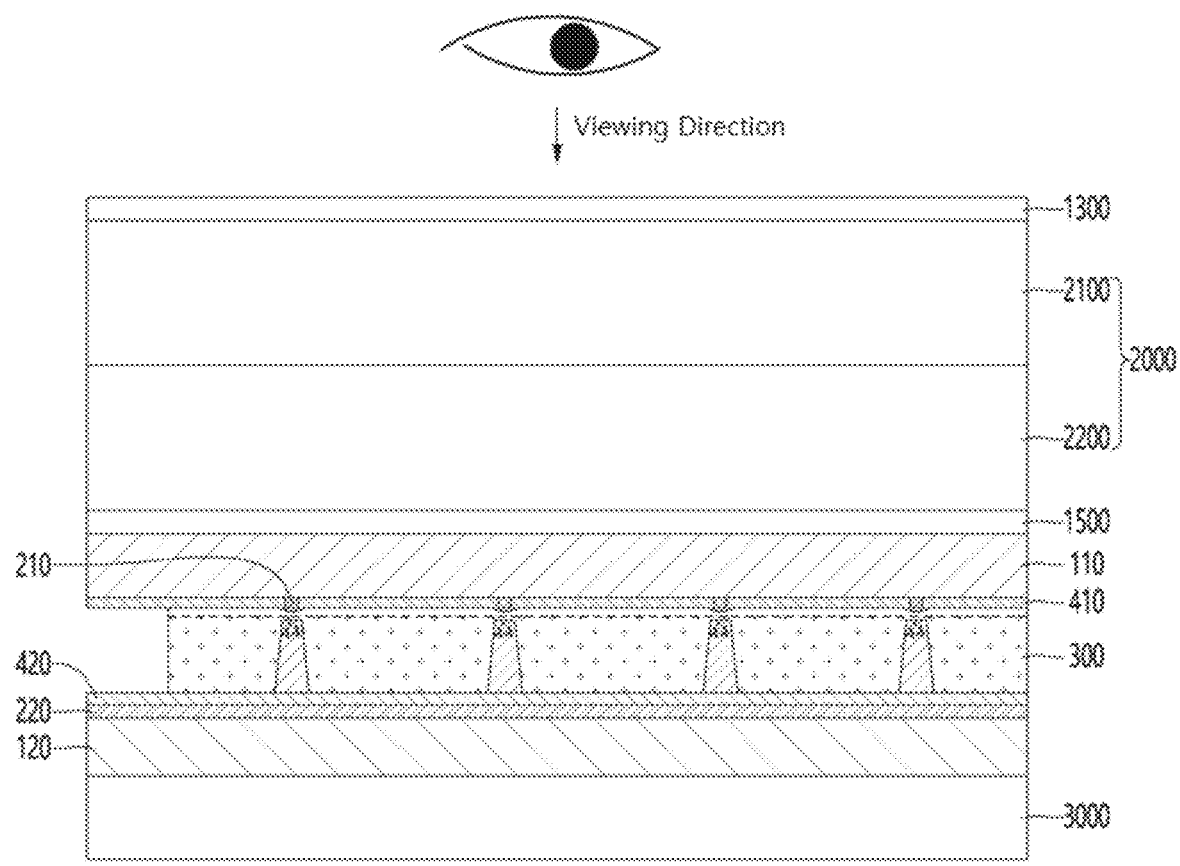
FIGS. 26 and 27 are cross-sectional views of a display device to which the light path control member according to the embodiment is applied.
Figure 27:
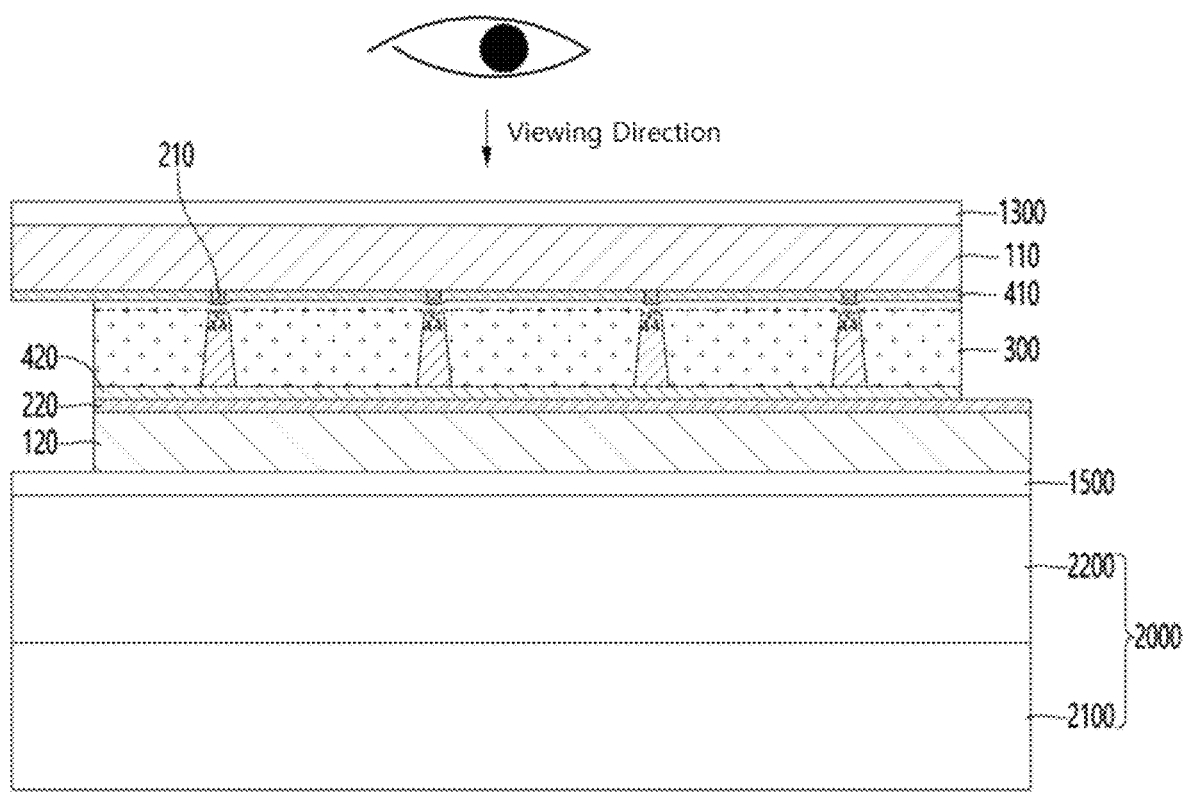

Referring to FIGS. 26 and 27, the light path control member 1000 according to an embodiment may be disposed on or under a display panel 2000.

The display panel 2000 and the light path control member 1000 may be disposed to be adhered to each other. For example, the display panel 2000 and the light path control member 1000 may be adhered to each other via an adhesive layer 1500. The adhesive layer 1500 may be transparent. For example, the adhesive layer 1500 may include an adhesive or an adhesive layer including an optical transparent adhesive material.

The adhesive layer 1500 may include a release film. In detail, when adhering the light path control member and the display panel, the light path control member and the display panel may be adhered after the release film is removed.

The display panel 2000 may include a first' substrate 2100 and a second' substrate 2200. When the display panel 2000 is a liquid crystal display panel, the light path control member may be formed under the liquid crystal panel. That is, when a surface viewed by the user in the liquid crystal panel is defined as an upper portion of the liquid crystal panel, the light path control member may be disposed under the liquid crystal panel. The display panel 2000 may be formed in a structure in which the first' substrate 2100 including a thin film transistor (TFT) and a pixel electrode and the second' substrate 2200 including color filter layers are bonded to each other with a liquid crystal layer interposed therebetween.

In addition, the display panel 2000 may be a liquid crystal display panel of a color filter on transistor (COT) structure in which a thin film transistor, a color filter, and a black electrolyte are formed at the first' substrate 2100 and the second' substrate 2200 is bonded to the first' substrate 2100 with the liquid crystal layer interposed therebetween. That is, a thin film transistor may be formed on the first' substrate 2100, a protective film may be formed on the thin film transistor, and a color filter layer may be formed on the protective film. In addition, a pixel electrode in contact with the thin film transistor may be formed on the first' substrate 2100. At this point, in order to improve an aperture ratio and simplify a masking process, the black electrolyte may be omitted, and a common electrode may be formed to function as the black electrolyte.

In addition, when the display panel 2000 is the liquid crystal display panel, the display device may further include a backlight unit 3000 providing light from a rear surface of the display panel 2000.

That is, as shown in FIG. 26, the light path control member may be disposed under the liquid crystal panel and on the backlight unit 3000, and the light path control member may be disposed between the backlight unit 3000 and the display panel 2000.

Alternatively, as shown in FIG. 27, when the display panel 2000 is an organic light emitting diode panel, the light path control member may be formed on the organic light emitting diode panel. That is, when the surface viewed by the user in the organic light emitting diode panel is defined as an upper portion of the organic light emitting diode panel, the light path control member may be disposed on the organic light emitting diode panel. The display panel 2000 may include a self-luminous element that does not require a separate light source. In the display panel 2000, a thin film transistor may be formed on the first' substrate 2100, and an organic light emitting element in contact with the thin film transistor may be formed. The organic light emitting element may include an anode, a cathode, and an organic light emitting layer formed between the anode and the cathode. In addition, the second' substrate 2200 configured to function as an encapsulation substrate for encapsulation may be further included on the organic light emitting element.

That is, light emitted from the display panel 2000 or the backlight unit 3000 may move from the second substrate 120 of the light path control member to the first substrate 110.

In addition, although not shown in drawings, a polarizing plate may be further disposed between the light path control member 1000 and the display panel 2000. The polarizing plate may be a linear polarizing plate or an external light reflection preventive polarizing plate. For example, when the display panel 2000 is a liquid crystal display panel, the polarizing plate may be the linear polarizing plate. Further, when the display panel 2000 is the organic light emitting diode panel, the polarizing plate may be the external light reflection inhibiting polarizing plate.

In addition, an additional functional layer 1300 such as an anti-reflection layer, an anti-glare, or the like may be further disposed on the light path control member 1000. Specifically, the functional layer 1300 may be adhered to one surface of the first substrate 110 of the light path control member. Although not shown in drawings, the functional layer 1300 may be adhered to the first substrate 110 of the light path control member via an adhesive layer. In addition, a release film for protecting the functional layer may be further disposed on the functional layer 1300.

Further, a touch panel may be further disposed between the display panel and the light path control member.

It is illustrated in the drawings that the light path control member is disposed at an upper portion of the display panel, but the embodiment is not limited thereto, and the light path control member may be disposed at various positions such as a position in which light is adjustable, that is, a lower portion of the display panel, or between a second substrate and a first substrate of the display panel, or the like.

In addition, it is shown in the drawings that the light conversion unit of the light path control member according to the embodiment is in a direction parallel or perpendicular to an outer surface of the second substrate, but the light conversion unit is formed to be inclined at a predetermined angle from the outer surface of the second substrate. Through this, a moire phenomenon occurring between the display panel and the light path control member may be reduced.

Figure 28:
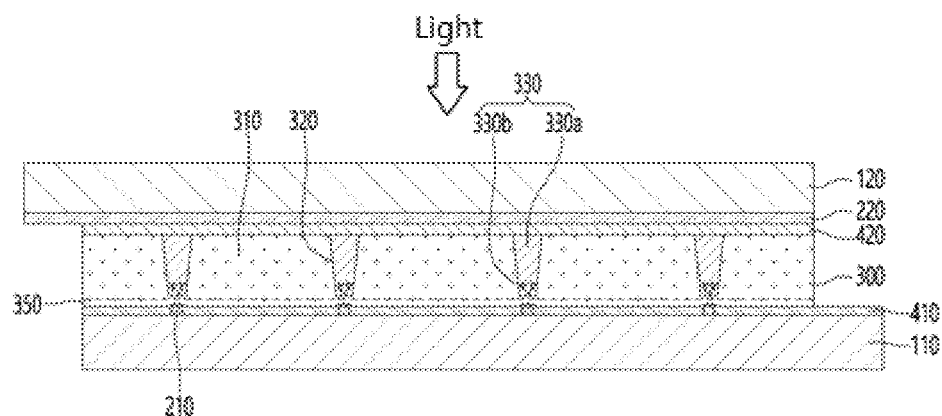
FIGS. 28 to 30 are views for explaining one embodiment of the display device to which the light path control member according to the embodiment is applied.
Figure 28:
Figure 28:
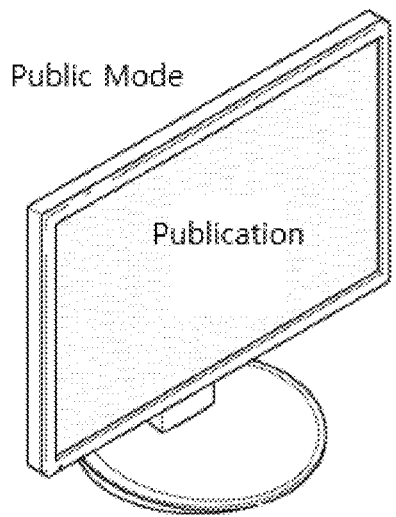
Figure 29:
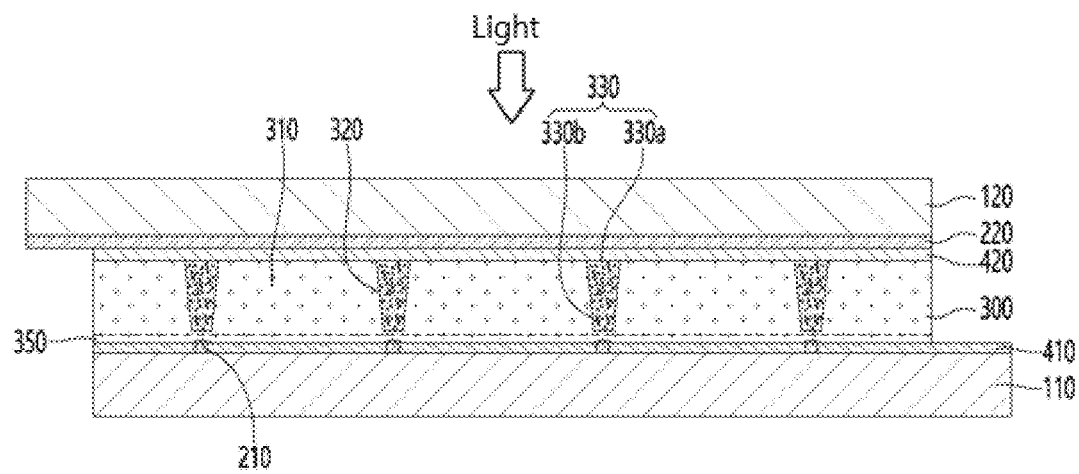
Figure 29:
Figure 29:
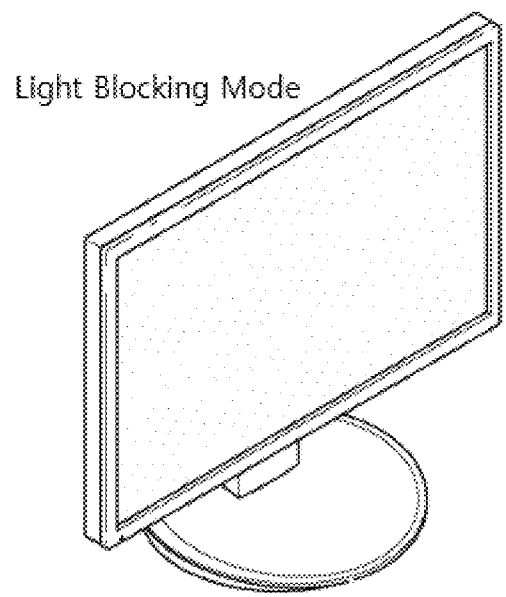
Figure 30:
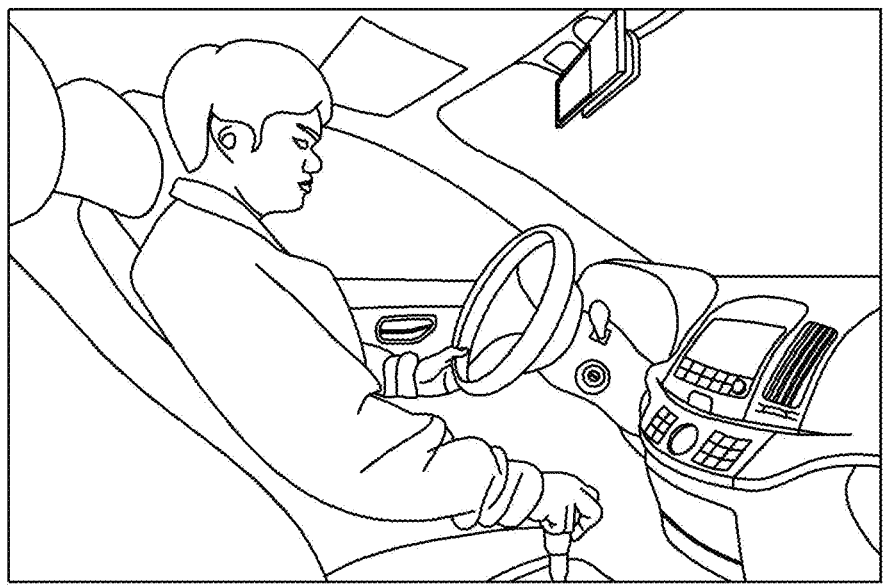

Referring to FIGS. 28 to 30, the light path control member according to the embodiment may be applied to a display device that displays a display.

For example, when power is applied to the light path control member as shown in FIG. 28, the accommodation part functions as the light transmitting part, so that the display device may be driven in the public mode, and when power is not applied to the light path control member as shown in FIG. 29, the accommodation part functions as the light blocking part, so that the display device may be driven in the light blocking mode.

Accordingly, a user may easily drive the display device in a privacy mode or a normal mode according to application of power.

Light emitted from the backlight unit or the self-luminous element may move from the first substrate toward the second substrate. Alternatively, the light emitted from the backlight unit or the self-luminous element may also move from the second substrate toward the first substrate.

In addition, referring to FIG. 30, the display device to which the light path control member according to the embodiment is applied may also be applied inside a vehicle.

For example, the display device including the light path control member according to the embodiment may display a video confirming information of the vehicle and a movement route of the vehicle. The display device may be disposed between a driver seat and a passenger seat of the vehicle.

In addition, the light path control member according to the embodiment may be applied to a dashboard that displays a speed, an engine, an alarm signal, and the like of the vehicle.

Further, the light path control member according to the embodiment may be applied to a front glass (FG) of the vehicle or right and left window glasses.

The characteristics, structures, effects, and the like described in the above-described embodiments are included in at least one embodiment of the present invention, but are not limited to only one embodiment. Furthermore, the characteristic, structure, and effect illustrated in each embodiment may be combined or modified for other embodiments by a person skilled in the art. Accordingly, it is to be understood that such combination and modification are included in the scope of the present invention.

In addition, embodiments are mostly described above, but the embodiments are merely examples and do not limit the present invention, and a person skilled in the art may appreciate that several variations and applications not presented above may be made without departing from the essential characteristic of embodiments. For example, each component specifically represented in the embodiments may be varied. In addition, it should be construed that differences related to such a variation and such an application are included in the scope of the present invention defined in the following claims.

The invention claimed is:

1. A light path control member comprising:
a first substrate on which a first direction and a second direction are defined;
a first electrode disposed on the first substrate;
a buffer layer disposed on the first substrate and the first electrode;
a second substrate disposed on the first substrate;
a second electrode disposed under the second substrate; and
a light conversion unit disposed between the first electrode and the second electrode,
wherein the light conversion unit includes a plurality of partition wall portions, and a plurality of accommodating portions disposed between adjacent partition wall portions of the plurality of partition wall portions,
wherein the plurality of accommodating portions extend in the second direction,
wherein the first electrode includes a plurality of first pattern electrodes extending in the second direction and spaced apart from each other,
wherein the buffer layer is disposed on the first substrate to cover the plurality of first pattern electrodes,
wherein the buffer layer includes a first portion overlapping with the plurality of first pattern electrodes along a thickness direction of the first substrate, and a second portion that does not overlap with the plurality of first pattern electrodes along the thickness direction,
wherein the first portion is disposed between the light conversion unit and the first pattern electrodes,
wherein the second portion is disposed between the light conversion unit and the first substrate, and
wherein the first portion of the buffer layer includes a convex surface that is convex toward the plurality of accommodating portions with respect to the second portion.

2. The light path control member of claim 1, wherein a width of each first pattern electrode of the plurality of first pattern electrodes is smaller than a width of a lower portion of each of the plurality of accommodating portions.

3. The light path control member of claim 1, wherein an interval between adjacent first pattern electrodes of the plurality of the first pattern electrodes is greater than a width of a lower portion of each of the plurality of partition wall portions.

4. The light path control member of claim 1, wherein the first substrate includes a first region where the plurality of first pattern electrodes are disposed and a second region where the plurality of first pattern electrodes are not disposed, and
wherein a ratio of an area of the second region to an entire area of the first substrate is between 55% and 90%.

5. The light path control member of claim 1, wherein the first electrode includes a first connection electrode connected to the plurality of first pattern electrodes,
wherein the plurality of first pattern electrodes are disposed on a light conversion region of the first substrate,
wherein the first connection electrode is disposed on a non-active region of the first substrate corresponding to an edge region of the first substrate surrounding the light conversion region, and
wherein the first connection electrode includes a pad part connected to a printed circuit board.

6. A light path control member comprising:
a first substrate on which a first direction and a second direction are defined;
a first electrode disposed on the first substrate;
a second substrate disposed on the first substrate;
a second electrode disposed under the second substrate; and
a light conversion unit disposed between the first electrode and the second electrode,
wherein the light conversion unit includes a plurality of partition wall portions, and a plurality of accommodating portions disposed between adjacent partition wall portions of the plurality of partition wall portions,
wherein the plurality of accommodating portions extend in the second direction,
wherein the first electrode includes a plurality of first pattern electrodes extending in the second direction and spaced apart from each other,
wherein a width in the first direction of each first pattern electrode of the plurality of first pattern electrodes is greater than a width in the first direction of a lower part of each of the plurality of accommodating portions,
wherein each first pattern electrode includes a first overlapping region that overlaps with the plurality of partition wall portions without overlapping with the lower part of the accommodating portion and a second overlapping region overlapping with the lower part of the plurality of accommodating portions, and
wherein a width in the first direction of the second overlapping region is greater than a width in the first direction of the first overlapping region.

7. The light path control member of claim 6, wherein an interval between adjacent first pattern electrodes of the plurality of first pattern electrodes is smaller than a width of a lower portion of each of the plurality of partition wall portions.

8. The light path control member of claim 5, wherein each first pattern electrode includes a 1-1 pattern electrode and a 1-2 pattern electrode extending in different directions,
wherein the 1-1 pattern electrode is disposed overlapping with the plurality of accommodating portions,
wherein the 1-2 pattern electrode is overlapped with the plurality of partition wall portions and the plurality of accommodating portions.

9. The light path control member of claim 8, wherein the 1-1 pattern electrode and the 1-2 pattern electrode are formed with a mesh shape.

10. A display device comprising:
a panel including at least one of a display panel and a touch panel; and
the light path control member of claim 1, which is disposed on or under the panel.

11. The light path control member of claim 8, wherein the 1-1 pattern electrode is connected to the first connection electrode, and
wherein the 1-2 pattern electrode is spaced apart from the first connection electrode.

12. The light path control member of claim 8, wherein the 1-1 pattern electrode and the 1-2 pattern electrode are tilted with respect to the second direction.

13. The light path control member of claim 1, wherein the second electrode includes a plurality of second pattern electrodes extending in the second direction and spaced apart from each other, and
wherein the plurality of second pattern electrodes overlap with the plurality of accommodating portions.

14. The light path control member of claim 13, wherein a width of each second pattern electrode is smaller than a width of a lower part of each of the plurality of accommodating portions.

15. The light path control member of claim 13, wherein an interval between adjacent second pattern electrodes of the plurality of second pattern electrodes is greater than a width of a lower portion of each of the plurality of partition wall portions.

16. The light path control member of claim 13, wherein the second substrate includes a third region where the plurality of second pattern electrodes are disposed and a fourth region where the plurality of second pattern electrodes are not disposed, and
wherein a ratio of an area of the third region to a total area of the second substrate is between 55% and 90%.

17. The light path control member of claim 13, wherein a width of each second pattern electrode is greater than a width of the lower part of each of the plurality of accommodating portions,
wherein each second pattern electrode includes a third overlapping region overlapping with the plurality of partition wall portions and a fourth overlapping region overlapping with the plurality of accommodating portions, and
wherein a width of the third overlapping region is greater than a width of the fourth overlapping region.

18. The light path control member of claim 1, wherein the second substrate includes a light conversion area and a non-active region,
wherein the second electrode includes a plurality of second pattern electrodes extending in the second direction and spaced apart from each other; and a second connection electrode connected to the plurality of second pattern electrodes,
wherein the plurality of second pattern electrodes are disposed in the light conversion region, and wherein the second connection electrode is disposed in the non-active region.

19. The light path control member of claim 18, wherein the second connection electrode includes a pad part connected to a printed circuit board.

20. The light path control member of claim 1, wherein the plurality of accommodating portions and the plurality of first pattern electrodes are tilted with respect to the second direction.

* * * * *